United States Patent
Liu et al.

(10) Patent No.: US 10,873,440 B2
(45) Date of Patent: Dec. 22, 2020

(54) TIME DIVISION DUPLEXING TECHNIQUES IN SHARED RADIO FREQUENCY SPECTRUM

(71) Applicant: QUALCOMM Incorporated, San Diego, CA (US)

(72) Inventors: Chih-Hao Liu, San Diego, CA (US);
Xiaoxia Zhang, San Diego, CA (US);
Tamer Kadous, San Diego, CA (US);
Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/507,366

(22) Filed: Jul. 10, 2019

(65) Prior Publication Data
US 2020/0021423 A1    Jan. 16, 2020

Related U.S. Application Data

(60) Provisional application No. 62/697,390, filed on Jul. 12, 2018.

(51) Int. Cl.
*H04W 16/14*    (2009.01)
*H04L 5/14*    (2006.01)
(Continued)

(52) U.S. Cl.
CPC .......... *H04L 5/1469* (2013.01); *H04L 1/1812* (2013.01); *H04L 5/0055* (2013.01);
(Continued)

(58) Field of Classification Search
None
See application file for complete search history.

(56) References Cited

U.S. PATENT DOCUMENTS 10,051,662 B2 *  8/2018  Li ..................... H04W 74/0808
10,091,819 B2 * 10/2018  Yin ................... H04W 74/0816
(Continued)

FOREIGN PATENT DOCUMENTS

WO    WO-2015184216 A1    12/2015

OTHER PUBLICATIONS

International Search Report and Written Opinion—PCT/US2019/041302—ISA/EPO—dated Sep. 20, 2019.
(Continued)

*Primary Examiner* — Sithu Ko
(74) *Attorney, Agent, or Firm* — Holland & Hart LLP

(57) ABSTRACT

Methods, systems, and devices for wireless communications are described that provide for selecting a time division duplexing (TDD) frame structure for communicating with a user equipment (UE) via a shared radio frequency spectrum in which a listen before talk (LBT) procedure is performed prior to transmitting. A frame based equipment (FBE) frame starting location for FBE frames is determined where the FBE frame starting location is offset from a starting location of the TDD frame structure and spans successive TDD frames. In some cases, the TDD frame structure may be configured such that the UE does not need to perform an LBT procedure, and thus the LBT process may be transparent to the UE, allowing UEs that are not specially configured to operate using an LBT procedure to use the shared radio frequency spectrum.

30 Claims, 29 Drawing Sheets

(51) Int. Cl.
*H04W 72/04* (2009.01)
*H04W 74/08* (2009.01)
*H04L 1/18* (2006.01)
*H04W 4/06* (2009.01)
*H04L 5/00* (2006.01)
*H04L 27/26* (2006.01)

(52) U.S. Cl.
CPC ........... *H04L 27/2607* (2013.01); *H04W 4/06* (2013.01); *H04W 72/0446* (2013.01); *H04W 74/0808* (2013.01)

(56) References Cited

U.S. PATENT DOCUMENTS

| | | | | |
|---|---|---|---|---|
| 10,491,263 | B2* | 11/2019 | Zheng | H04W 56/00 |
| 10,499,421 | B2* | 12/2019 | Luo | H04W 74/0808 |
| 2015/0055541 | A1* | 2/2015 | Zhang | H04W 72/005 |
| | | | | 370/312 |
| 2016/0095120 | A1* | 3/2016 | Gaal | H04L 5/0053 |
| | | | | 370/329 |
| 2016/0183302 | A1* | 6/2016 | Chen | H04L 5/0091 |
| | | | | 370/329 |
| 2016/0234835 | A1* | 8/2016 | Yerramalli | H04W 16/14 |
| 2016/0234845 | A1* | 8/2016 | Zhang | H04W 72/0453 |
| 2016/0262188 | A1* | 9/2016 | Zhang | H04W 74/0808 |
| 2016/0381567 | A1* | 12/2016 | Bhushan | H04L 5/14 |
| | | | | 370/329 |
| 2017/0237463 | A1* | 8/2017 | Zheng | H04W 16/14 |
| | | | | 370/328 |
| 2017/0318607 | A1* | 11/2017 | Tiirola | H04W 74/0808 |
| 2019/0075581 | A1* | 3/2019 | Salem | H04W 16/14 |

OTHER PUBLICATIONS

LG Electronics et al., "WF on FBE-based LBT Operation", 3GPP Draft; R1-150757 WF on LBT-FBE_R2, 3rd Generation Partnership Project (3GPP), Mobile Competence Centre, 650, Route Des Lucioles, F-06921 Sophia-Antipolis Cedex, France, vol. RAN WG1. No. Athens, Greece; Feb. 9, 2015-Feb. 16, 2015, XP050949203, Retrieved from the Internet: URL:http://www.3gpp.org/ftp/tsg_ran/WG1_RL1/TSGR1_80/Docs/ [retrieved on Feb. 16, 2015], 3 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

300

| TDD Config. | DwPTS (Symbols) | GP (Symbols) | UpPTS (Symbols) |
|---|---|---|---|
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |

305

TIME DIVISION DUPLEXING TECHNIQUES IN SHARED RADIO FREQUENCY SPECTRUM

CROSS REFERENCE

The present Application for Patent claims the benefit of U.S. Provisional Patent Application No. 62/697,390 by LIU, et al., entitled "TIME DIVISION DUPLEXING TECHNIQUES IN SHARED RADIO FREQUENCY SPECTRUM," filed Jul. 12, 2018, assigned to the assignee hereof, and expressly incorporated herein by in its entirety.

BACKGROUND

The following relates generally to wireless communications, and more specifically to time division duplexing techniques in shared radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support time division duplexing (TDD) techniques in shared radio frequency spectrum. Generally, the described techniques provide for selecting a TDD frame structure for communicating with a user equipment (UE) via a shared radio frequency spectrum in which a listen before talk (LBT) procedure is performed prior to transmitting. A frame based equipment (FBE) frame starting location for FBE frames is then determined where the FBE frame starting location is offset from a starting location of the TDD frame structure. A base station may perform the LBT procedure and initiate transmissions with the UE responsive to a successful LBT procedure, and the FBE frame may extend across two TDD frames. In some cases, the TDD frame structure may be configured such that the UE does not need to perform an LBT procedure, and thus the LBT process may be transparent to the UE, allowing UEs that are not specially configured to operate using an LBT procedure to use the shared radio frequency spectrum for communications.

A method of wireless communication is described. The method may include selecting a TDD frame structure for communicating with a UE via a shared radio frequency spectrum, the TDD frame structure including one or more downlink subframes, one or more uplink subframes, and one or more special subframes, determining a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame, performing an LBT procedure prior to the FBE frame starting location, and initiating transmissions with the UE responsive to a successful LBT procedure, where the transmissions start at the FBE frame starting location and the first FBE frame extend into a second TDD frame having the TDD frame structure.

An apparatus for wireless communication is described. The apparatus may include a processor, memory in electronic communication with the processor, and instructions stored in the memory. The instructions may be executable by the processor to cause the apparatus to select a TDD frame structure for communicating with a UE via a shared radio frequency spectrum, the TDD frame structure including one or more downlink subframes, one or more uplink subframes, and one or more special subframes, determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame, perform an LBT procedure prior to the FBE frame starting location, and initiate transmissions with the UE responsive to a successful LBT procedure, where the transmissions start at the FBE frame starting location and the first FBE frame extend into a second TDD frame having the TDD frame structure.

Another apparatus for wireless communication is described. The apparatus may include means for selecting a TDD frame structure for communicating with a UE via a shared radio frequency spectrum, the TDD frame structure including one or more downlink subframes, one or more uplink subframes, and one or more special subframes, determining a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame, performing an LBT procedure prior to the FBE frame starting location, and initiating transmissions with the UE responsive to a successful LBT procedure, where the transmissions start at the FBE frame starting location and the first FBE frame extend into a second TDD frame having the TDD frame structure.

A non-transitory computer-readable medium storing code for wireless communication is described. The code may include instructions executable by a processor to select a TDD frame structure for communicating with a UE via a shared radio frequency spectrum, the TDD frame structure including one or more downlink subframes, one or more uplink subframes, and one or more special subframes, determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame, perform an LBT procedure prior to the FBE frame starting location, and initiate transmissions with the UE responsive to a successful LBT procedure, where the transmissions start at the FBE frame starting location and the first FBE frame extend into a second TDD frame having the TDD frame structure.

Some examples of the method, apparatuses, and non-transitory computer-readable medium described herein may further include operations, features, means, or instructions for configuring a preceding subframe to the first downlink subframe within the TDD frame structure to provide a transmission gap prior to the FBE frame starting location. In some examples of the method, apparatuses, and non-transitory computer-readable medium described herein, the transmission gap provides an idle period, an LBT gap, or both, prior to the FBE frame starting location.

In some examples of the method, apparatuses, and non-transitory computer-readable medium described herein, the one or more special subframes include one or more downlink symbols, one or more uplink symbols, and a guard period between the downlink symbols and uplink symbols, and where the method further may include operations, features, means, or instructions for configuring the UE with a timing advance that provides a duration of the guard period that may be shorter than an LBT gap threshold. In some examples of the method, apparatuses, and non-transitory computer-readable medium described herein, the UE initiates uplink transmissions in the one or more uplink symbols without performing an LBT procedure based on the duration of the guard period being shorter than the LBT gap threshold.

Some examples of the method, apparatuses, and non-transitory computer-readable medium described herein may further include operations, features, means, or instructions for configuring a preceding subframe to the first downlink subframe within the TDD frame structure as a multimedia broadcast single frequency network (MBSFN) subframe and transmitting control signaling during only a portion of the MBSFN subframe. In some examples of the method, apparatuses, and non-transitory computer-readable medium described herein, the first downlink subframe may be a second subframe in time of a downlink subframe burst and the preceding subframe to the first downlink subframe may be a first downlink subframe in time of the downlink subframe burst.

Some examples of the method, apparatuses, and non-transitory computer-readable medium described herein may further include operations, features, means, or instructions for configuring a preceding subframe to the first downlink subframe within the TDD frame structure to provide an LBT sensing period for performing the LBT procedure and configuring the UE with a timing advance that results in uplink transmissions within the preceding subframe finishing prior to a start of the LBT sensing period. In some examples of the method, apparatuses, and non-transitory computer-readable medium described herein, the transmission gap further provides an idle period prior to the FBE frame starting location, and where the TDD frame structure may be selected to provide a guard period within the one or more special subframes that meets or exceeds an idle time threshold. In some examples of the method, apparatuses, and non-transitory computer-readable medium described herein, the idle time threshold corresponds to five percent of a duration of the FBE frame, and where the duration of the FBE frame corresponds to a duration of the TDD frame structure. In some examples of the method, apparatuses, and non-transitory computer-readable medium described herein, the first downlink subframe may be a first subframe in time of a last downlink subframe burst of the selected TDD configuration.

Some examples of the method, apparatuses, and non-transitory computer-readable medium described herein may further include operations, features, means, or instructions for performing a second LBT procedure prior to a subsequent second FBE frame starting location within the second TDD frame, continuing transmissions with the UE responsive to a successful second LBT procedure during the second TDD frame and into a third TDD frame having the TDD frame structure and receiving one or more acknowledgment/negative-acknowledgment (ACK/NACK) feedback transmissions from the UE during the first TDD frame, second TDD frame, and third TDD frame. Some examples of the method, apparatuses, and non-transitory computer-readable medium described herein may further include operations, features, means, or instructions for performing a third LBT procedure prior to a subsequent third FBE frame starting location within the third TDD frame, discontinuing transmissions with the UE responsive to an unsuccessful third LBT procedure during the third TDD frame and receiving at least one additional ACK/NACK feedback transmission from the UE after discontinuing transmissions with the UE in an uplink transmission that may be exempt from LBT procedures.

DETAILED DESCRIPTION

Figure 1:
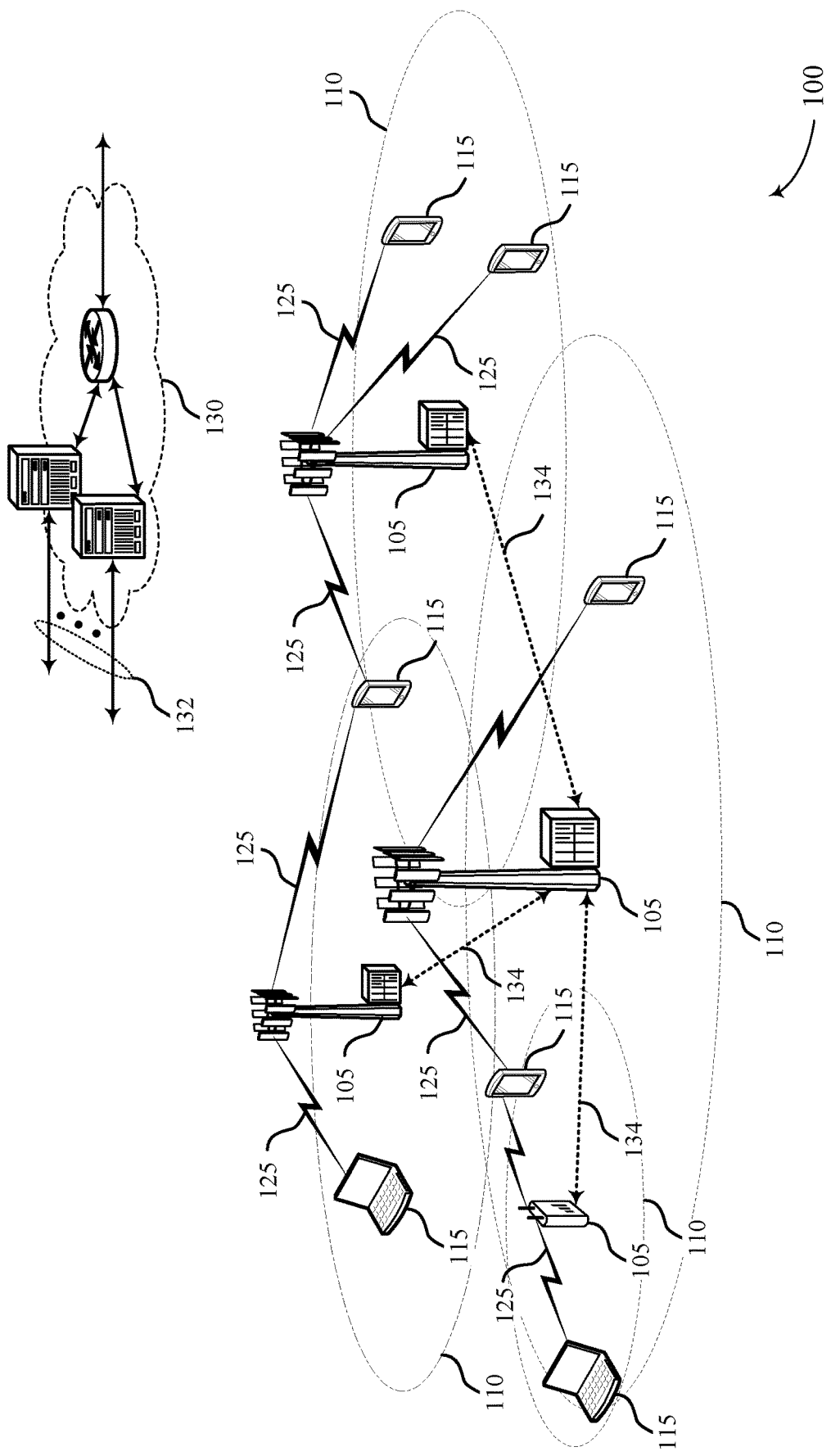
FIG. 1 illustrates an example of a system for wireless communications that supports time division duplexing techniques in shared radio frequency spectrum in accordance with aspects of the present disclosure.

The described techniques relate to improved methods, systems, devices, or apparatuses that support time division duplexing in shared or unlicensed radio frequency spectrum. In various aspects, the described techniques provide for selecting a TDD frame structure for communicating with a user equipment (UE) via a shared radio frequency spectrum in which a listen before talk (LBT) procedure is performed prior to transmitting. In some aspects, the TDD frame structure may be selected and configured such that the LBT procedures are performed only at a base station and are transparent to the UE.

In some examples, unlicensed radio frequency spectrum bands may be used for 4G/Long Term Evolution (LTE) or 5G/new radio (NR) communications. Unlicensed radio frequency spectrum may be used in combination with, or independent from, a dedicated or licensed radio frequency spectrum band. The dedicated radio frequency spectrum band may include a radio frequency spectrum band licensed to particular users for particular uses. The unlicensed or shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner. The terms unlicensed radio frequency spectrum and shared radio frequency spectrum are used interchangeably herein.

Wireless communications systems that use shared radio frequency spectrum may use a listen-before-talk (LBT) procedure to provide fair access to wireless resources and to verify that a channel is unoccupied by another transmitter prior to initiating new transmissions. For example, potential collisions may arise in scenarios where un-scheduled wireless systems coexist with scheduled wireless systems (such as a MuLTEfire system), and LBT procedures, such as clear channel assessments (CCAs) may allow for such coexistence. In some cases, a base station may configure a UE to transmit in one or more uplink subframes of a TDD configuration, such as through radio resource control (RRC) signaling that indicates the TDD configuration and one or more other parameters (e.g., a timing advance (TA) parameter) associated with uplink transmissions, which may provide timings for uplink transmissions such that the UE may transmit without performing an LBT procedure.

Techniques such as discussed herein may allow for a relatively simple design candidate for an unlicensed controlled environment based on LTE procedures or other established radio access technology (RAT) (e.g., NR) procedures. In some cases, TDD configurations from LTE may be re-used in shared spectrum for a controlled environment (e.g., factory automation). Further, techniques that allow UE operation without LBT may allow for re-use of established UE implementations based on legacy TDD-LTE. In such cases, a base station may provide configurations to the UEs and perform LBT in order to operate in the shared or unlicensed spectrum.

In certain jurisdictions, certain rules may be established for using shared or unlicensed radio frequency spectrum, such as frame based equipment (FBE) rules. FBE is an LBT protocol for medium access according to the European Telecommunications Standards Institute (ETSI), although other regulatory bodies may have similar rules for such spectrum access. FBE is equipment which transmits or receives based on a fixed frame structure with a periodicity equal to a fixed frame period. An initiating device (e.g., a base station, eNB or gNB) operating according to FBE rules perform a Clear Channel Assessment (CCA) at the start of the fixed frame period and initiate the dialogue with responding devices (e.g. UEs) for the maximum duration of channel occupancy time (COT) if CCA clears, otherwise the whole fixed frame period is skipped. The COT in FBE may not be greater than 95% of the fixed frame period and may be followed by an idle period until the start of the next fixed frame period such that the idle period is at least 5% of the COT, with a minimum of 100 µs. Accordingly, FBE systems provide a fixed idle period within each FBE frame.

Further, the initiating equipment can have multiple transmissions within a COT without performing an additional CCA, providing the gap between such transmissions does not exceed 16 µs. If the gap exceeds 16 µs, the equipment may continue transmissions by performing single shot LBT. In accordance with various aspects of the present disclosure, a base station may be an initiating device and may configure a TDD frame structure that is offset with a FBE frame, and associated parameters, in accordance with FBE rules. For example, a TDD configuration may provide a large enough gap between uplink to downlink switching within the FBE frame for the base station to perform one shot LBT (e.g. a CCA on a frequency band) if the gap exceeds 16 µs. The responding device (e.g., a UE) may proceed with transmissions without performing a CCA) if these transmissions are initiated at most 16 µs after the last transmission by the initiating device that issued the grant. As indicated above, various techniques as discussed herein provide that a UE may not need to perform an LBT procedure based on configurations that provide uplink transmissions within 16 µs after a downlink transmission. Additionally, techniques are provided for transmission of acknowledgment/negative-acknowledgment (ACK/NACK) feedback (e.g. hybrid automatic repeat request (HARQ) ACK/NACK feedback) from a UE to a base station even in the event that an LBT fails for a FBE frame that is to carry the ACK/NACK feedback.

Aspects of the disclosure are initially described in the context of a wireless communications system. Various examples of TDD and overlapping FBE frames are illustrated and discussed in accordance with various aspects of the present disclosure. Aspects of the disclosure are further illustrated by and described with reference to apparatus diagrams, system diagrams, and flowcharts that relate to time division duplexing techniques in shared radio frequency spectrum.

FIG. 1 illustrates an example of a wireless communications system 100 that supports time division duplexing techniques in shared radio frequency spectrum in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may be an example of a system that uses shared radio frequency spectrum according to TDD configurations.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

Aspects of wireless communications system 100 may be configured as a MuLTEFire network, and an access point (AP) may be configured as a MuLTEFire eNB or base station 105. Wireless communications system 100 may include aspects of an LTE/LTE-A/NR network, a Wi-Fi network, a MuLTEFire network, a neutral host small cell network, or the like, operating with overlapping coverage areas. A MuLTEFire network may include APs and/or base stations 105 communicating with UEs 115 in unlicensed radio frequency spectrum band, e.g., without a licensed radio frequency anchor carrier. For example, the MuLTEFire network may operate without an anchor carrier in licensed radio frequency spectrum.

In an unlicensed frequency portion of the shared radio frequency spectrum band, UEs 115 or base stations 105 may traditionally perform a medium-sensing procedure to contend for access to the frequency spectrum. For example, UE 115 or base station 105 may perform an LBT procedure such as a clear channel assessment (CCA) prior to communicating in order to determine whether the shared channel is available. In some cases, TDD transmissions may follow a successful LBT, i.e., the TDD transmissions may follow a determination that the shared channel is available. A CCA may include an energy detection or energy sensing procedure to determine whether there are any other active transmissions. For example, each base station 105 may randomly choose a backoff counter (with may be a certain duration or a number of symbols) and listen to a channel including resources the base station 105 is contending for until the counter decrements to zero. If the counter reaches zero for a certain base station 105 and no other transmissions are detected, the base station 105 may start transmitting. If the counter does not reach zero before another signal is detected, the base station 105 has lost contention for resource and refrains from transmitting.

In some examples, a base station 105 may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in a frequency division duplexing (FDD) mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Various techniques discussed herein provide for selecting a TDD frame structure for communicating with a UE 115 via a shared radio frequency spectrum in which an LBT procedure is performed prior to transmitting. A FBE frame starting location for FBE frames is determined where the FBE frame starting location is offset from a starting location of the TDD frame structure. A base station 105 may perform the LBT procedure and initiate transmissions with the UE 115 responsive to a successful LBT procedure, and the FBE frame extend across two TDD frames. In some cases, the TDD frame structure may be configured such that the UE 115 does not need to perform an LBT procedure, and thus the LBT process may be transparent to the UE 115, allowing UEs 115 that are not specially configured to operate using an LBT procedure to use the shared radio frequency spectrum for communications.

Figure 2:
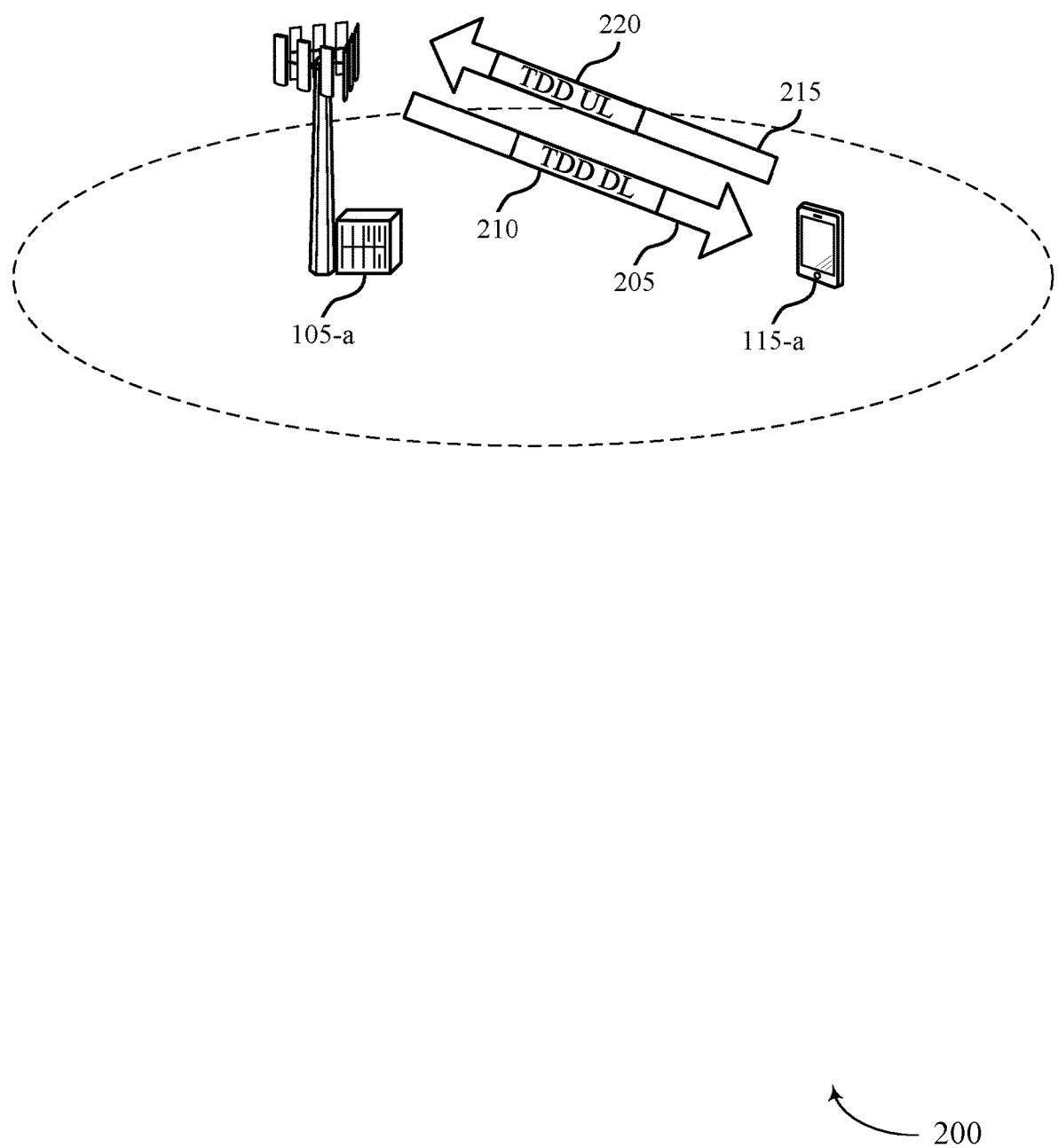
FIG. 2 illustrates an example of a wireless communications system that supports time division duplexing techniques in shared radio frequency spectrum in accordance with aspects of the present disclosure.

FIG. 2 illustrates an example of a wireless communications system 200 that supports time division duplexing techniques in shared radio frequency spectrum in accordance with aspects of the present disclosure. In some examples, wireless communications system 200 may implement aspects of wireless communications system 100. Wireless communications system 200 may include a base station 105-a and UE 115-a that may be examples of the corresponding devices described with reference to FIG. 1. For example, UE 115-a may be configured with a TDD frame structure and transmit and receive transmissions in accordance with the TDD frame structure without needing to perform an LBT procedure. In some examples, the base station 105-a may configure the UE 115-a for TDD communications that include downlink transmissions 205 that include TDD downlink subframes 210. The UE 115-a may, responsive to receiving one or more downlink transmissions 205, transmit uplink transmissions 215 which may contain TDD uplink transmissions 220.

In some cases, as will be discussed in more detail below, a FBE frame and associated LBT procedure may be offset or shifted in time relative to a configured TDD frame structure. Such an offset may allow for a reduced number of LBT procedures. In some cases, a 10 ms FBE frame may be started from a first or second subframe of a last downlink burst in a configured TDD-LTE frame format, and wrap around the TDD-LTE frame structure. In such a manner, the last downlink burst may continue through subframe 0 and save one CCA at the beginning of the TDD frame.

Figure 3:
FIG. 3 illustrates an example of TDD frame structures that support time division duplexing techniques in shared radio frequency spectrum in accordance with aspects of the present disclosure.
Figure 3:

FIG. 3 illustrates an example of TDD frame structures illustrated in tables 300, 305 that support time division duplexing techniques in shared radio frequency spectrum in accordance with aspects of the present disclosure. In some examples, TDD frame structures may implement aspects of wireless communications system 100 or 200. In this example, available TDD frame configurations are illustrated in table 300 of TDD frame structures that list uplink, downlink, and special subframe locations within a 10 ms TDD radio frame. Further, different parameters of TDD special subframe structures are listed in table 305, including a number of downlink pilot time slot (DwPTS) symbols, a number of guard period (GP) symbols, and a number of uplink pilot time slot (UpPTS) symbols.

Based on the TDD configurations, it can be observed that each TDD-LTE frame structure starts with "DSU" followed by one or more downlink bursts in the later part of 10 ms frame. If the FBE frame were to start at subframe 0 of the TDD frame, one LBT procedure would be performed prior to subframe 0, and one or more other LBT procedures would be performed prior to subsequent downlink burst(s). By shifting a start of the FBE frame to a later downlink burst in a TDD frame, it may be possible to reduce the number of LBT procedures for some TDD configurations. For example, TDD configurations 1-6 all end with 'D,' and TDD configurations 3-5 each end with relatively long 'D' burst. Thus, by defining a 10 ms FBE frame, and starting the 10 ms FBE frame from a first or second subframe of a last downlink burst in certain TDD frame configurations (i.e., configurations 1-6) and wrap around the TDD frame structure, the last downlink burst may continue through subframe 0 and save one LBT at the beginning of the TDD configuration. For example, in TDD configuration 4, the FBE frame may start at subframe 4 or 5, and in TDD configuration 5 the FBE frame may start at subframe 3 or 4.

Figure 4:
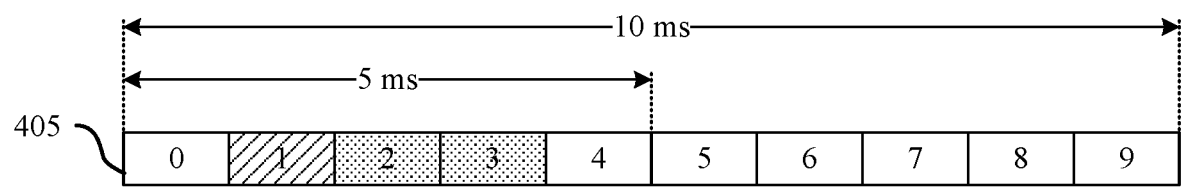
FIG. 4 illustrates an example of TDD configuration 4 that supports time division duplexing techniques in shared radio frequency spectrum in accordance with aspects of the present disclosure.
Figure 4:
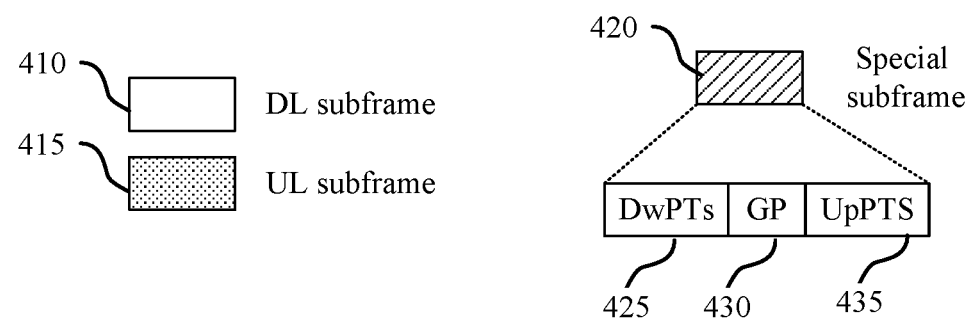

FIG. 4 illustrates an example of a TDD configuration 400 (TDD configuration 4) that supports time division duplexing techniques in shared radio frequency spectrum in accordance with aspects of the present disclosure. In some examples, TDD configuration 400 may implement aspects of wireless communications system 100 or 200. In this TDD configuration 400, a TDD frame 405 may include downlink subframes 410, uplink subframes 415, and a special subframe 420. Within the special subframe 420, one or more symbols may be provided for a DwPTS 425, a GP 430, and a UpPTS 435. In some cases, as will be discussed in more detail below, a base station 105 may configure a UE 115 with a timing advance to provide that the GP is short enough that the UE 115 does not need to perform an LBT procedure prior to starting uplink transmissions during the UpPTS 435.

As indicated above, a UE 115 may not be required to perform an LBT procedure (e.g., a CCA) if the uplink transmission is initiated at most 16 μs after a latest downlink transmission. Thus, a UE 115 without capability to perform a CCA would start uplink transmissions less than 16 μs after the base station downlink transmission (e.g., immediately after the base station downlink transmission). In some cases, for a given FBE frame, a scheduler at the base station 105 may ensure that uplink transmissions from a given UE 115 always start in the UpPTS 435 to avoid LBT operation on UE side. As indicated, in some cases the base station 105 may configure additional artificial timing advance (TA) at the UE 115 to ensure the end of the downlink to the start of uplink transmissions is no more than 16 In some cases, a one symbol gap can be configured between DwPTS 425 and UpPTS 435 for special subframe 420. In some examples, the UE 115 may be configured with an additional artificial TA (e.g. 35 μs) which ensures the end of downlink to the start of uplink is no more than 16 According to established TA procedures, a TA offset is provided for TDD mode operations, which provides a 20 μs offset, and in factory automation deployments it is expected that TA values will be small enough that an additional TA up to the 35 μs may still accommodate that actual TAs will not exceed a maximum TA value. As indicated above, the FBE frame may be offset or shifted relative to the TDD frame configurations, various examples of which are provided in FIGS. 5-20.

Figure 5:
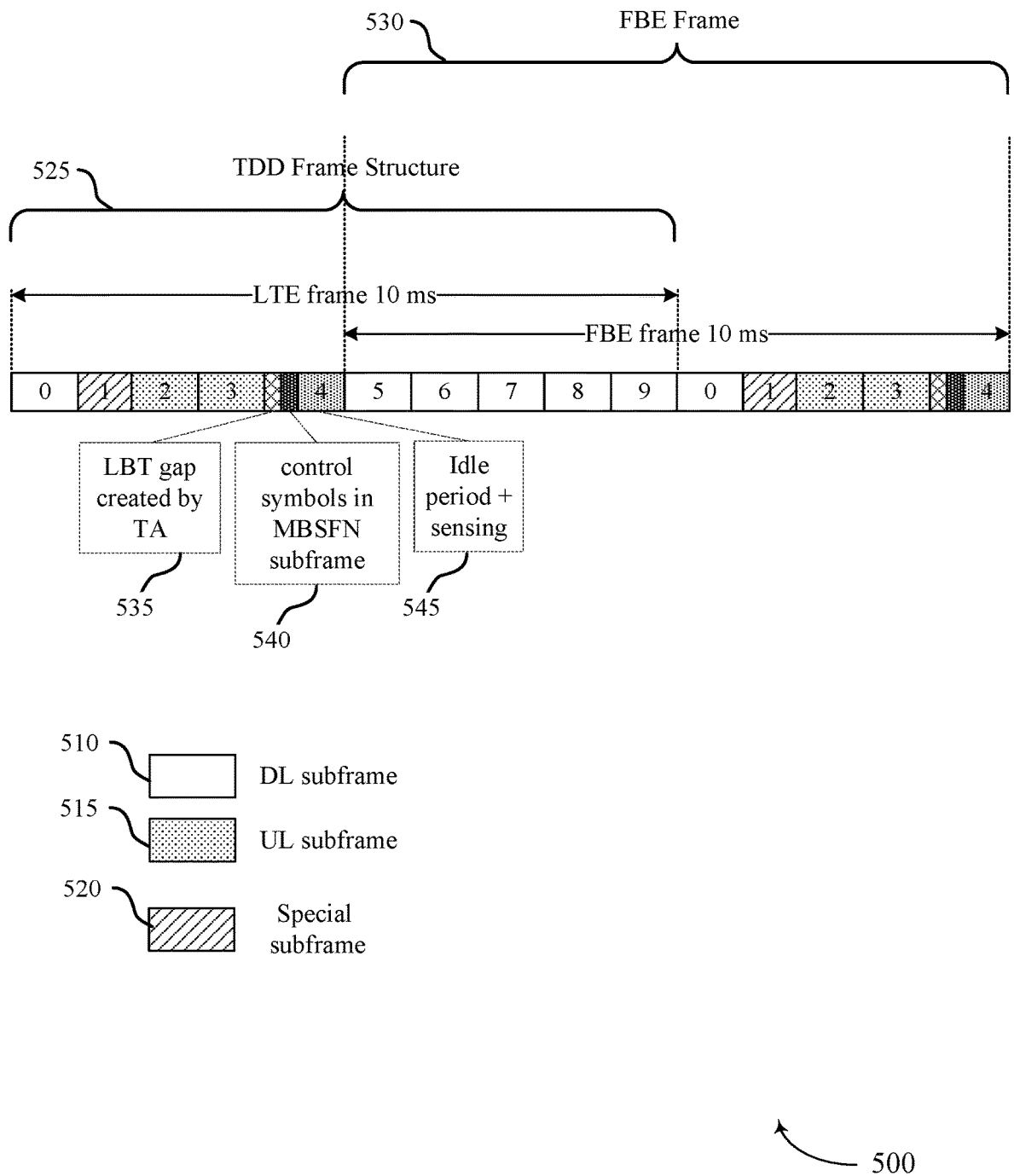
FIG. 5 illustrates an example of offset TDD and FBE frames that provide a FBE idle period that supports time division duplexing techniques in shared radio frequency spectrum in accordance with aspects of the present disclosure.

FIG. 5 illustrates an example of offset TDD and FBE frames 500 that provide a FBE idle period that supports time division duplexing techniques in shared radio frequency spectrum in accordance with aspects of the present disclosure. In some examples, offset TDD and FBE frames 500 may implement aspects of wireless communications system 100 or 200. In this example, a TDD configuration four is illustrated which includes downlink subframes 510, uplink subframes 515, and special subframes 520. The TDD frame structure 525 and FBE frame 530 are offset, and in this example the FBE frame 530 starts at subframe 5 of the TDD frame structure 525, and continues through subframe 4 of a subsequent TDD frame.

In this example, in order to provide a FBE idle period at least 5% of the COT, the base station 105 may configure subframe 4 of the TDD frame structure 525 as a multimedia broadcast single frequency network (MBSFN) subframe. A MBSFN subframe will be recognized by the UE 115 as a subframe in which broadcast transmissions are provided and, if the UE 115 is not configured to receive such broadcast transmissions, the UE 115 may disregard the subframe and not provide any ACK/NACK feedback associated with such subframes. The base station 105 may thus not transmit during a portion of the MBSFN subframe, which may result in an idle time in accordance with the FBE rules. For example, for a 9 ms COT, the idle period is 450 μs which corresponds to seven OFDM symbols. Thus, the base station 105 may reserve seven symbols of the MBSFN subframe for the idle period and for performing a CCA. In some examples, the base station 105 may configure an initial subframe of a last downlink burst as a MBSFN subframe, and in the example of FIG. 5 subframe 4 is configured as MBSFN subframe. In this example, an initial two control symbols 540 of the MBSFN subframe may be transmitted in order to allow for consistent cell-specific reference signal processing on the UE 115. Prior to the two control symbols 540, a TA may be configured such that a sufficient gap 535 is provided for the base station 105 to perform an LBT procedure. The remaining 12 symbols may remain idle to cover the idle period and LBT procedure time 545.

Figure 6:
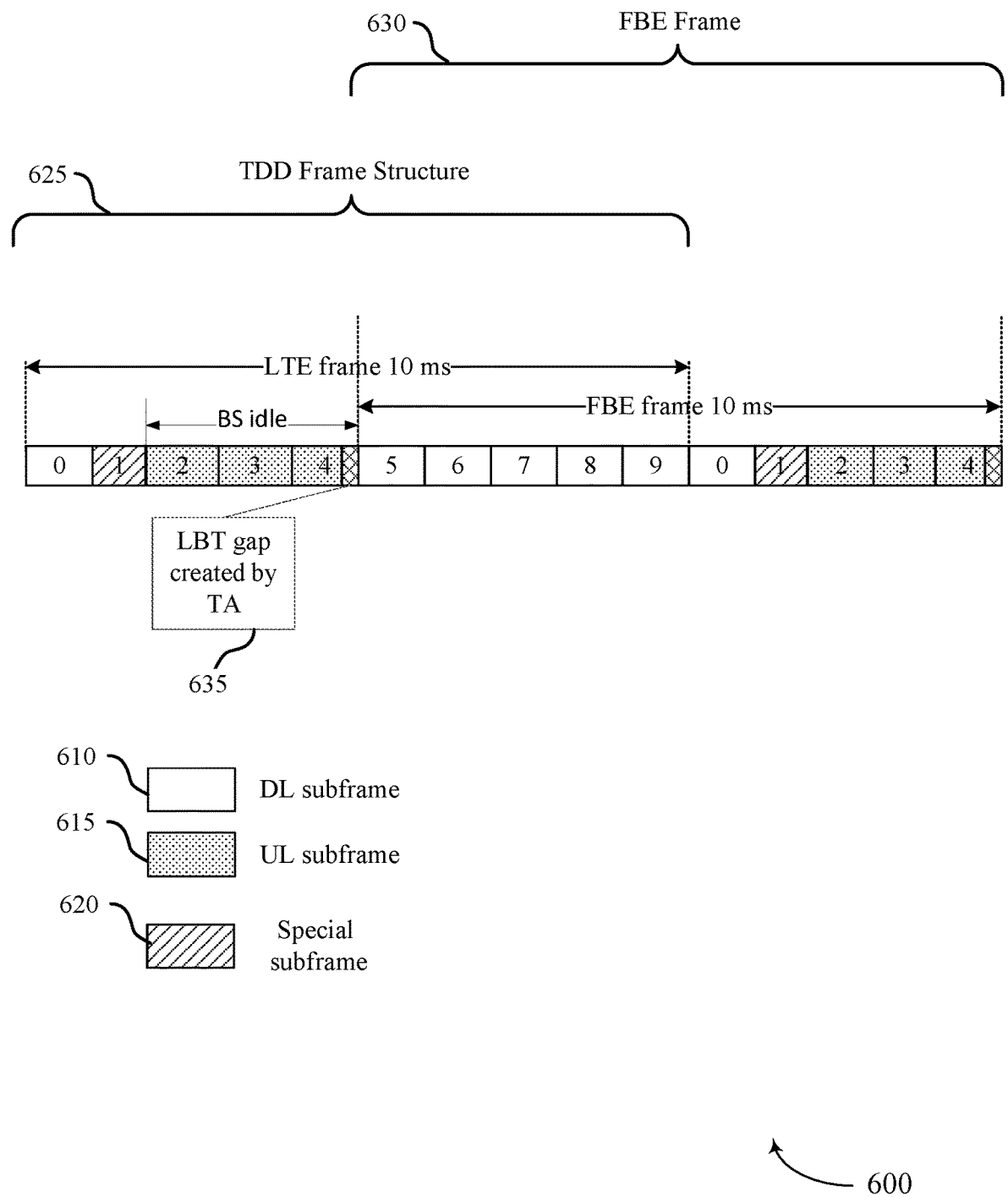
FIG. 6 illustrates an example of offset TDD and FBE frames that provide an LBT gap that supports time division duplexing techniques in shared radio frequency spectrum in accordance with aspects of the present disclosure.

FIG. 6 illustrates an example of offset TDD and FBE frames 600 that provide an LBT gap that supports time division duplexing techniques in shared radio frequency spectrum in accordance with aspects of the present disclosure. In some examples, offset TDD and FBE frames 600 may implement aspects of wireless communications system 100 or 200. In this example, a TDD configuration three is illustrated which includes downlink subframes 610, uplink subframes 615, and special subframes 620. The TDD frame structure 625 and FBE frame 630 are offset, and in this example the FBE frame 630 starts at subframe 5 of the TDD frame structure 625, and continues through subframe 4 of a subsequent TDD frame.

In this example, an LBT gap 635 is created at the end of the last 'U' subframe in the last uplink burst the TDD frame structure 625. In some cases, the LBT gap is created by introducing additional TA at the UE 115 starting at special subframe 620. Such a TA results in the UE 115 starting uplink transmissions early, and thus the uplink transmissions would likewise finish early during subframe 3 and thereby create the LBT gap 635 prior to the start of downlink transmissions in subframe 4. In the example of FIG. 6, for TDD configuration 3, the TA is applied by the UE 115 to uplink subframes 1 through 4. Additionally, the base station 105 may be scheduled to be idle during subframe 4, which may satisfy the FBE idle time requirement prior to the start of downlink transmissions if the LBT passes. The base station 105 may perform single shot medium sensing (e.g., LBT or CCA) prior to the next FBE boundary at the start of FBE frame 630. The UE 115 may transmit during subframe 4 (e.g., the UE 115 may transmit physical uplink control channel (PUCCH) or physical uplink shared channel (PUSCH) transmissions, and the LBT gap 635 allows the base station to perform sensing without uplink interference from the UE 115. The TA may be configured at the UE 115 by the base station 105 via RRC signaling during a connection establishment, for example, such that the additional TA is provided to allow for the LBT gap 635.

Figure 7:
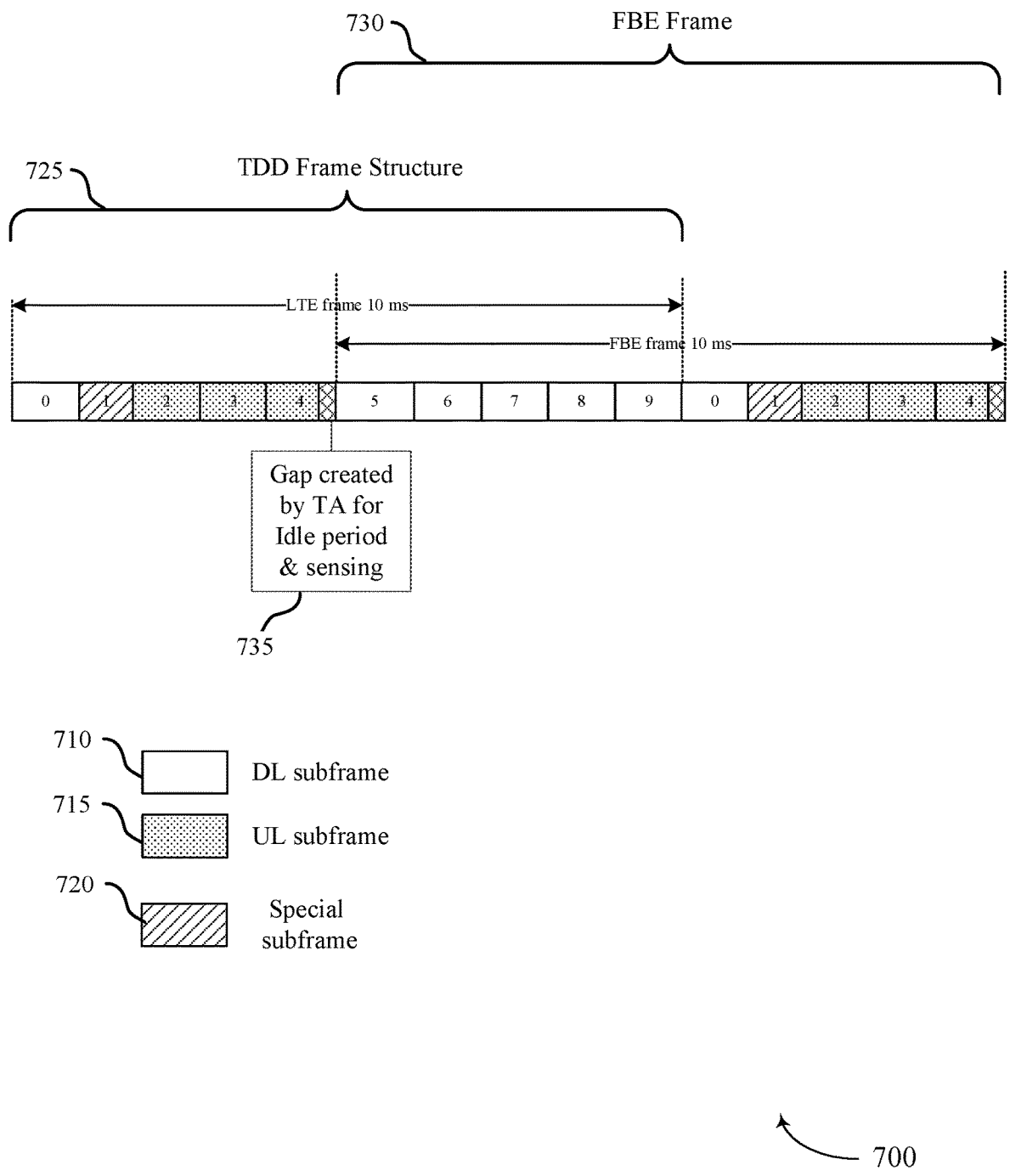
FIG. 7 illustrates an example of offset TDD and FBE frames that provide an LBT gap that supports time division duplexing techniques in shared radio frequency spectrum in accordance with aspects of the present disclosure.

FIG. 7 illustrates an example of offset TDD and FBE frames that provide an LBT gap 700 that supports time division duplexing techniques in shared radio frequency spectrum in accordance with aspects of the present disclosure. In some examples, offset TDD and FBE frames that provide an LBT gap 700 may implement aspects of wireless communications system 100 or 200. In this example, a TDD configuration three is illustrated which includes downlink subframes 710, uplink subframes 715, and special subframes 720. The TDD frame structure 725 and FBE frame 730 are offset, and in this example the FBE frame 730 starts at subframe 5 of the TDD frame structure 725, and continues through subframe 4 of a subsequent TDD frame.

In this example, a gap 735 is created at the end of the last 'U' subframe in the last uplink burst the TDD frame structure 725 that is large enough to satisfy the FBE idle period and allow for LBT sensing at the base station. In some cases, the gap 735 is created by introducing additional TA at the UE 115 starting at special subframe 720. Such a TA may be applied to subframes 1, 2, 3, and 4, and results in the UE 115 starting uplink transmissions early, and thus the uplink transmissions would likewise finish early during subframe 4 and thereby create the gap 735 prior to the start of downlink transmissions in subframe 5. In order to provide a large enough gap 735, a special subframe configuration of the TDD configuration may be selected such that the GP is sufficiently long enough to accommodate the duration of the gap 735 by allowing the UE 115 to start transmitting UpPTS early during the GP. As indicated above, for a 10 ms FBE frame, the idle period is approximately 450 μs or seven OFDM symbols (assuming 15 kHz tone spacing), and thus the base station 105 may configure a TDD special subframe configuration, according to the tables in FIG. 3 to provide a sufficiently large GP. As indicated in table 305 of FIG. 3, TDD special subframe configurations 0 and 5 allow a guard period greater 450 μs. Accordingly, using such techniques, the base station 105 may configure a UE 115 with TDD special subframe configuration 0 or 5, and with a sufficiently large TA to provide the gap 735.

Figure 8A:
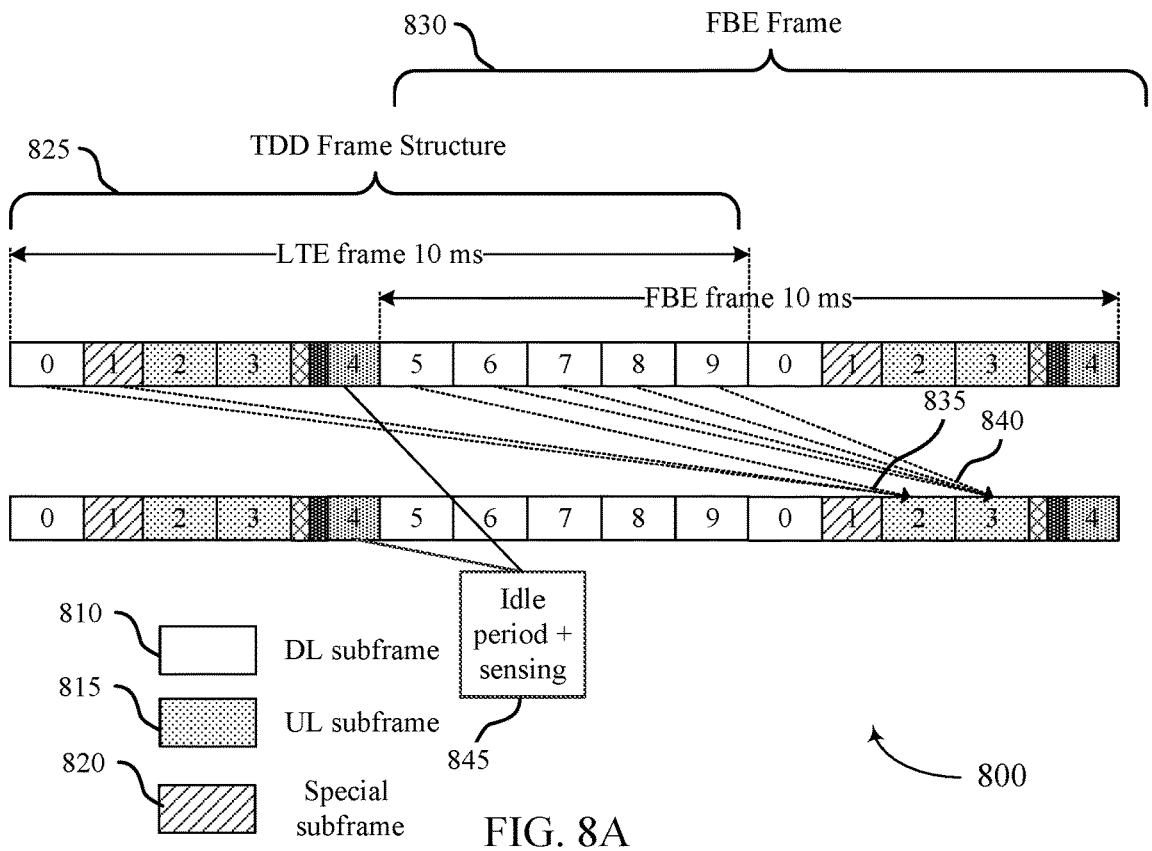
FIGS. 8A and 8B illustrate examples of ACK/NACK feedback timing that support time division duplexing techniques in shared radio frequency spectrum in accordance with aspects of the present disclosure.
Figure 8B:
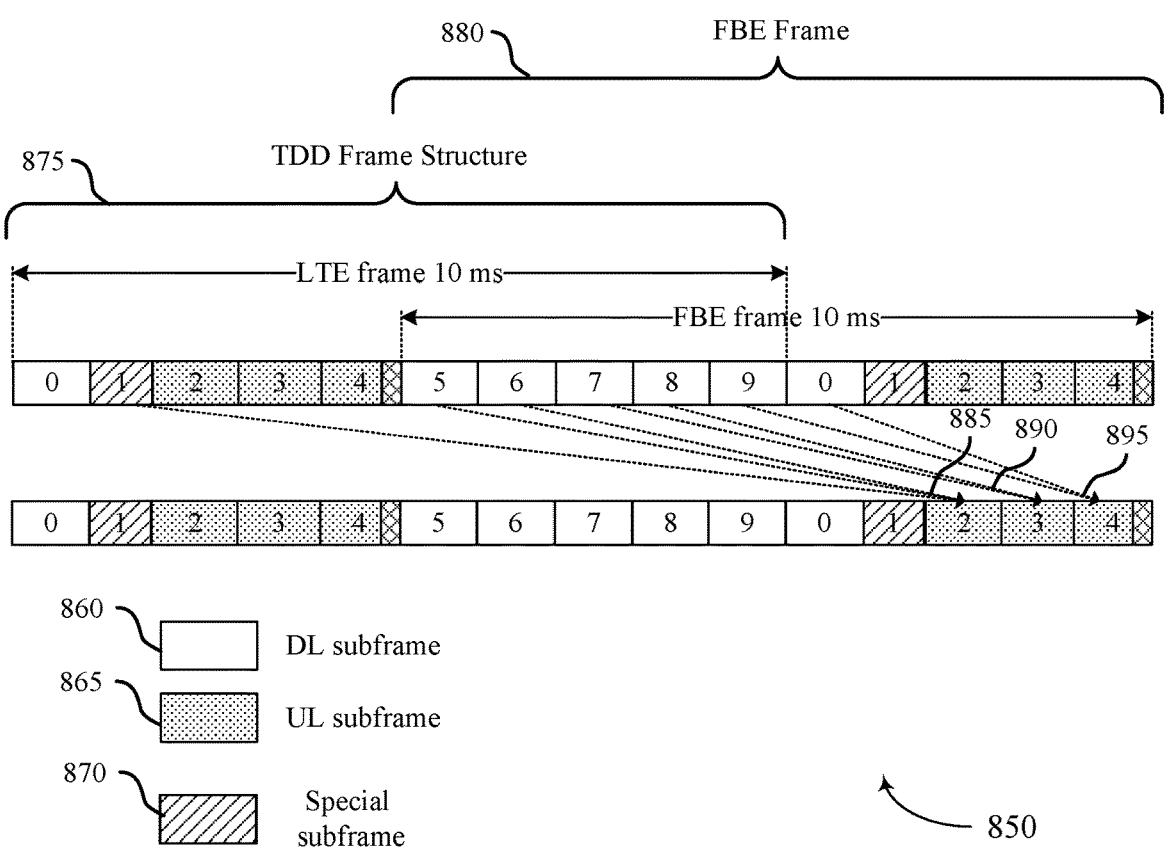

FIGS. 8A and 8B illustrate examples of a ACK/NACK feedback timing 800, 850 that support time division duplexing techniques in shared radio frequency spectrum in accordance with aspects of the present disclosure. In some examples, ACK/NACK feedback timing 800, 850 may implement aspects of wireless communications system 100 or 200. As indicated above, a UE 115 may transmit ACK/NACK feedback information (e.g., HARQ ACK/NACK feedback) to a base station 105 to indicate successful or unsuccessful reception of one or more downlink transmissions from the base station 105. Further, the base station 105 may transmit ACK/NACK feedback to the UE 115 to indicate successful reception of uplink transmissions.

In the example of FIG. 8A, ACK/NACK feedback timing 800 is illustrated for the example of FIG. 5, in which idle period 845 may be configured is subframe 4 via configuring a MBSFN subframe. In this example, TDD configuration 4 is illustrated which includes downlink subframes 810, uplink subframes 815, and special subframes 820. The TDD frame structure 825 and FBE frame 830 are offset, and in this example the FBE frame 830 starts at subframe 5 of the TDD frame structure 825, and continues through subframe 4 of a subsequent TDD frame. In this example, the downlink feedback timeline may re-use the downlink HARQ timeline as in TDD-LTE, thus allowing the shared spectrum operation to be transparent to the UE 115. In TDD configuration 4, only PDSCH transmissions in subframe 0 and 1 require uplink feedback 835 in a subsequent FBE frame while PDSCH transmissions in other downlink subframes are self-contained within the same FBE frame in uplink feedback 835 or uplink feedback 840.

In some cases, however, the base station 105 may be unsuccessful in obtaining the shared radio frequency spectrum in the subsequent LBT procedure, and may not obtain the medium for the ACK/NACK of subframes 0 and 1. In some cases, if the base station 105 does not clear LBT in the subsequent FBE frame, UE 115 may perform a CCA-Exempt Transmission (CET) for transmitting the ACK/NACK feedback. A CET is allowed in the FBE rules, which allow CET transmissions up to 5% within an observation period of 50 ms. In some deployments, such as in factory automation deployments, that use such techniques, the overall CET transmission for uplink feedback is expected to be less than 5% as the base station LBT success rate is expected to be more than 50% in such environments. Thus, even if the base station 105 does not pass LBT, the UE 115 continues to transmit the ACK/NACK feedback according to the configured feedback transmission timeline by using a transmission that is exempt from LBT.

In the example of FIG. 8B, ACK/NACK feedback timing 850 is illustrated for the examples in which an LBT gap, or idle period and LBT gap, is provided prior to the start of FBE frame 880 through configuring a UE 115 with a TA to accommodate the gap. In this example, TDD configuration 3 is illustrated which includes downlink subframes 860, uplink subframes 865, and special subframes 870. The TDD frame structure 875 and FBE frame 880 are offset, and in this example the FBE frame 880 starts at subframe 5 of the TDD frame structure 875, and continues through subframe 4 of a subsequent TDD frame. In this example, again, the downlink feedback timeline may re-use the downlink HARQ timeline as in TDD-LTE, thus allowing the shared spectrum operation to be transparent to the UE 115. In TDD configuration 3, only PDSCH transmissions in subframe 1 require uplink feedback 885 in a subsequent FBE frame while PDSCH transmissions in other downlink subframes are self-contained within the same FBE frame in uplink feedback 885, 890, or 895.

Figure 9:
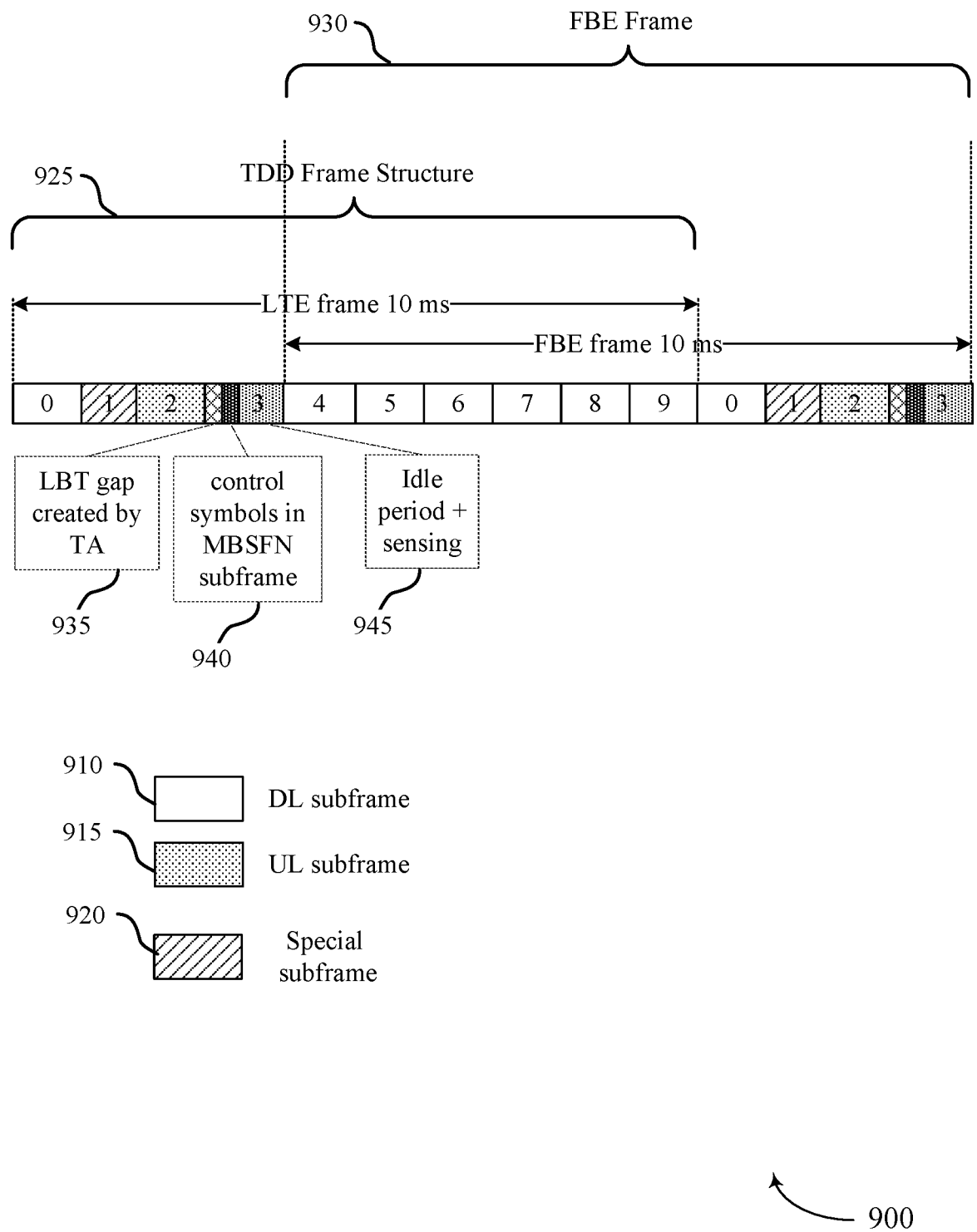
FIG. 9 illustrates an example of offset TDD and FBE frames that supports time division duplexing techniques in shared radio frequency spectrum in accordance with aspects of the present disclosure.

FIG. 9 illustrates another example of offset TDD and FBE frames 900 that supports time division duplexing techniques in shared radio frequency spectrum in accordance with aspects of the present disclosure. In some examples, offset TDD and FBE frames 900 may implement aspects of wireless communications system 100 or 200. In this example, TDD configuration 5 is illustrated which includes downlink subframes 910, uplink subframes 915, and special subframes 920. The TDD frame structure 925 and FBE frame 930 are offset, and in this example the FBE frame 930 starts at subframe 4 of the TDD frame structure 925, and continues through subframe 3 of a subsequent TDD frame.

In this example, in order to provide a FBE idle period at least 5% of the COT, the base station 105 may configure subframe 3 of the TDD frame structure 925 as a MBSFN subframe. The base station 105 may thus not transmit during a portion of the MBSFN subframe, which may result in an idle time in accordance with the FBE rules. In this example, an initial two control symbols 940 of the MBSFN subframe may be transmitted in order to allow for consistent cell-specific reference signal processing on the UE 115. Prior to the two control symbols 940, a TA may be configured such that a sufficient LBT gap 935 is provided for the base station 105 to perform an LBT procedure. The remaining 12 symbols may remain idle to cover the idle period and LBT procedure time 945.

Figure 10:
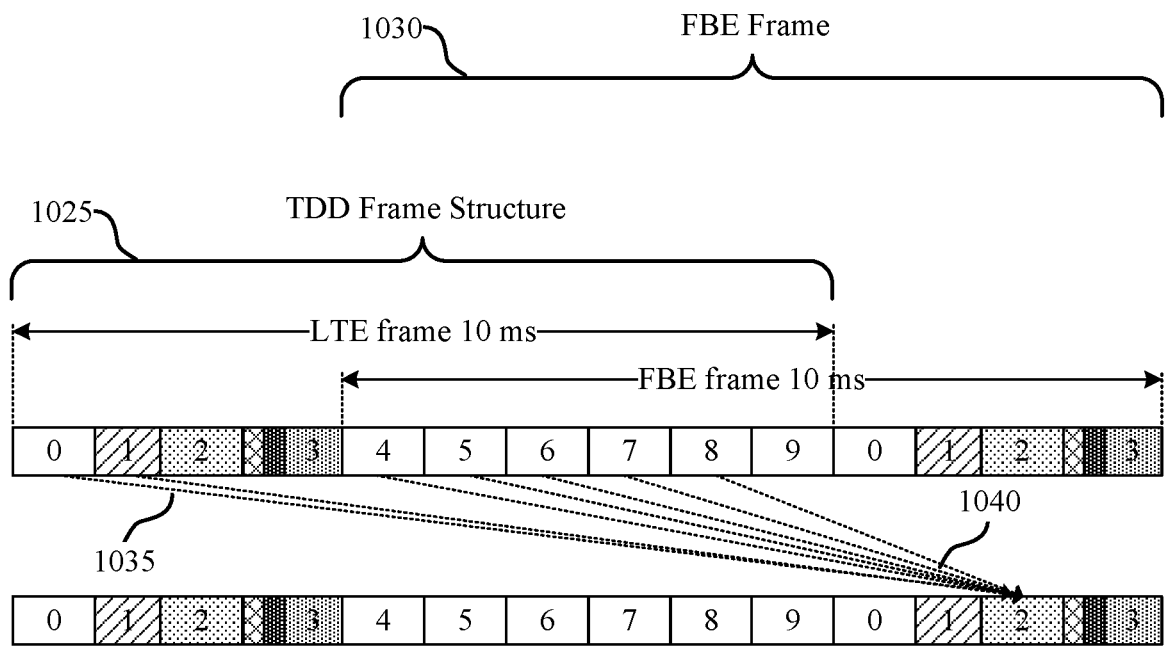
FIG. 10 illustrates another example of downlink ACK/NACK feedback timing that supports time division duplexing techniques in shared radio frequency spectrum in accordance with aspects of the present disclosure.
Figure 10:
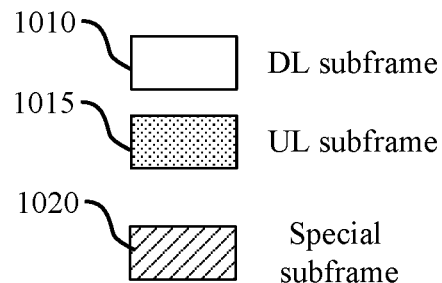

FIG. 10 illustrates another example of ACK/NACK feedback timing 1000 that supports time division duplexing techniques in shared radio frequency spectrum in accordance with aspects of the present disclosure. In some examples, ACK/NACK feedback timing 1000 may implement aspects of wireless communications system 100 or 200.

In the example of FIG. 10, ACK/NACK feedback timing 1000 is illustrated for the example of FIG. 9, in which idle period may be configured in subframe 3 via configuring a MBSFN subframe. In this example, TDD configuration 5 is illustrated which includes downlink subframes 1010, uplink subframes 1015, and special subframes 1020. The TDD frame structure 1025 and FBE frame 1030 are offset, and in this example the FBE frame 1030 starts at subframe 4 of the TDD frame structure 1025, and continues through subframe 3 of a subsequent TDD frame. In this example, the downlink feedback timeline may re-use the downlink HARQ timeline as in TDD-LTE, thus allowing the shared spectrum operation to be transparent to the UE 115. In TDD configuration 5, only PDSCH transmissions in subframe 0, 1, and 9 require uplink feedback 1035 in a subsequent FBE frame while PDSCH transmissions in other downlink subframes are self-contained within the same FBE frame in uplink feedback 1040. In cases where the base station 105 fails LBT for the subsequent FBE frame, the UE 115 may transmit any remaining ACK/NACK feedback in a CET.

Figure 11:
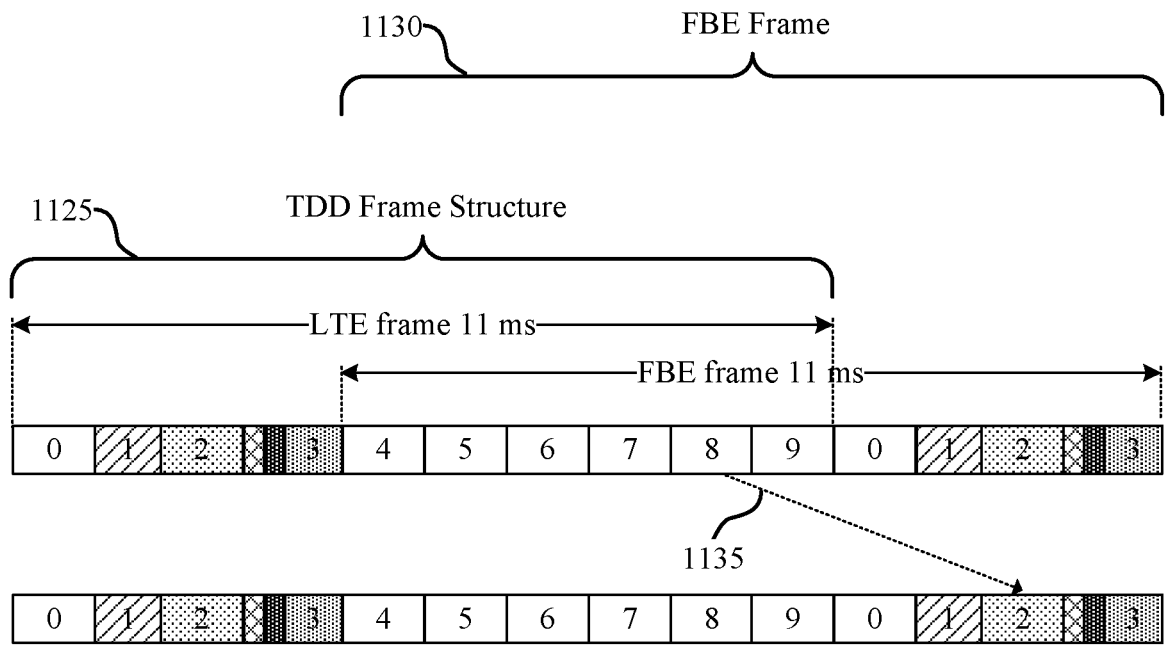
FIG. 11 illustrates an example of uplink ACK/NACK feedback timing that supports time division duplexing techniques in shared radio frequency spectrum in accordance with aspects of the present disclosure.
Figure 11:
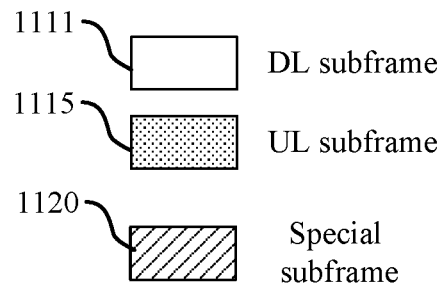

FIG. 11 illustrates an example of uplink ACK/NACK feedback timing 1100 that supports time division duplexing techniques in shared radio frequency spectrum in accordance with aspects of the present disclosure. In some examples, uplink ACK/NACK feedback timing 1100 may implement aspects of wireless communications system 100 or 200.

In the example of FIG. 11, uplink ACK/NACK feedback timing 1100 is illustrated for the example of FIG. 9, in which idle period may be configured in subframe 3 via configuring a MBSFN subframe. In this example, TDD configuration 5 is illustrated which includes downlink subframes 1110, uplink subframes 1115, and special subframes 1120. The TDD frame structure 1125 and FBE frame 1130 are offset, and in this example the FBE frame 1130 starts at subframe 4 of the TDD frame structure 1125, and continues through subframe 3 of a subsequent TDD frame. In this example, the uplink feedback timeline may re-use the HARQ timeline as in TDD-LTE, thus allowing the shared spectrum operation to be transparent to the UE 115. In such cases, uplink grants and the uplink transmissions are always self-contained within the same FBE frame. In cases where the base station 105 does not have medium access in the next FBE frame, it will not transmit physical HARQ indicator channel (PHICH) or an uplink grant, and the UE 115 will simply hold its data in buffer and wait for PHICH or grant to transmit feedback 1135. The PUSCH grant for subframe 2 and the corresponding PUSCH transmission are always self-contained within the same FBE frame.

Figure 12:
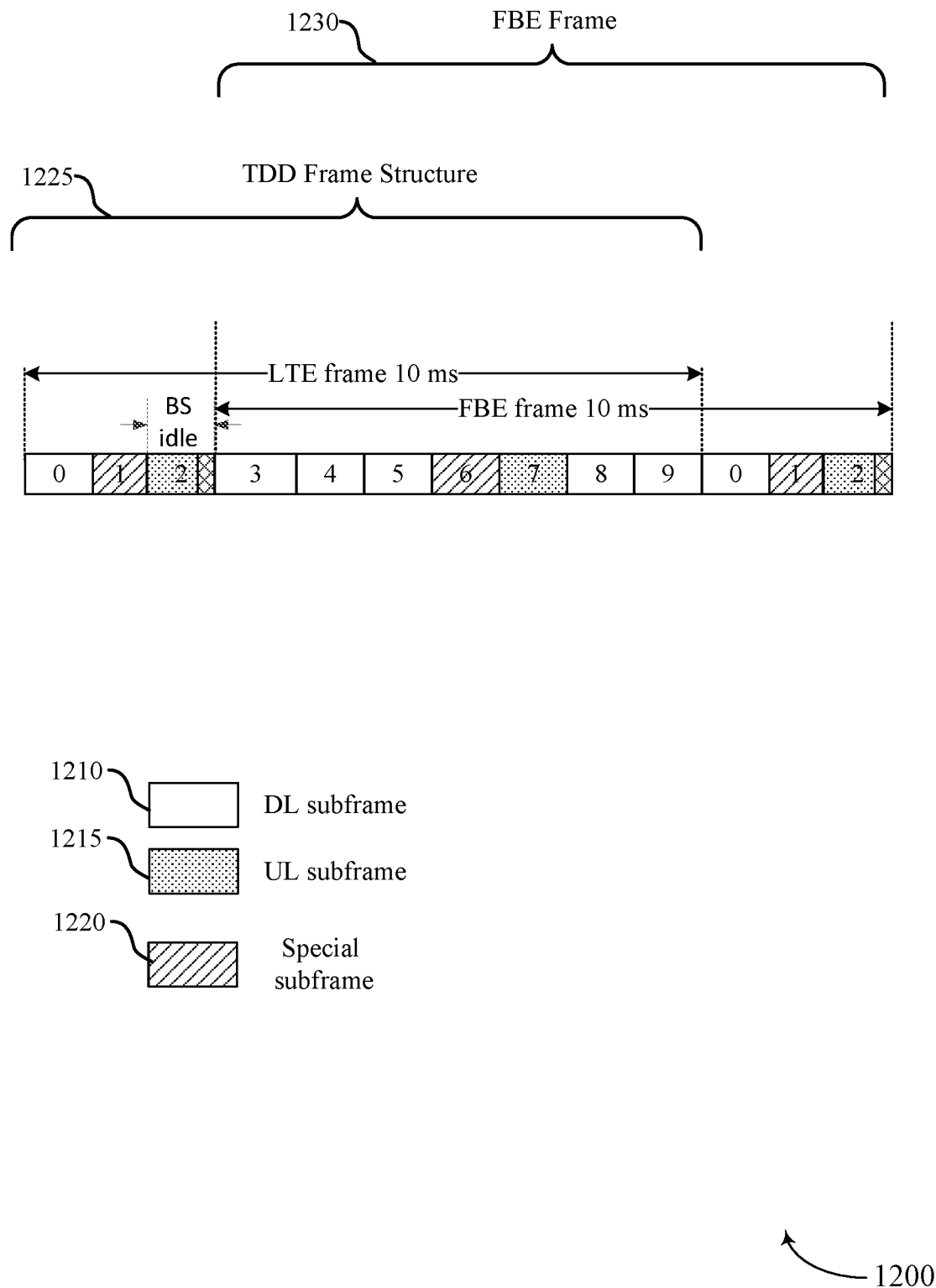
FIG. 12 illustrates another example of offset TDD and FBE frames that supports time division duplexing techniques in shared radio frequency spectrum in accordance with aspects of the present disclosure.

FIG. 12 illustrates another example of offset TDD and FBE frames 1200 that support time division duplexing techniques in shared radio frequency spectrum in accordance with aspects of the present disclosure. In some examples, offset TDD and FBE frames 1200 may implement aspects of wireless communications system 100 or 200. In this example, a TDD configuration 2 is illustrated which includes downlink subframes 1210, uplink subframes 1215, and special subframes 1220. The TDD frame structure 1225 and FBE frame 1230 are offset, and in this example the FBE frame 1230 starts at subframe 3 of the TDD frame structure 1225, and continues through subframe 2 of a subsequent TDD frame.

In this example, an LBT gap is created at the end of the 'U' subframe 2 in the TDD frame structure 1225. In some cases, the LBT gap is created by introducing additional TA at the UE 115 starting at special subframe 1220. Additionally, the base station 105 may be scheduled to be idle during subframe 2, which may satisfy the FBE idle time requirement prior to the start of downlink transmissions if the LBT passes. The base station 105 may perform single shot medium sensing (e.g., LBT or CCA) prior to the next FBE boundary at the start of FBE frame 1230.

Figure 13:
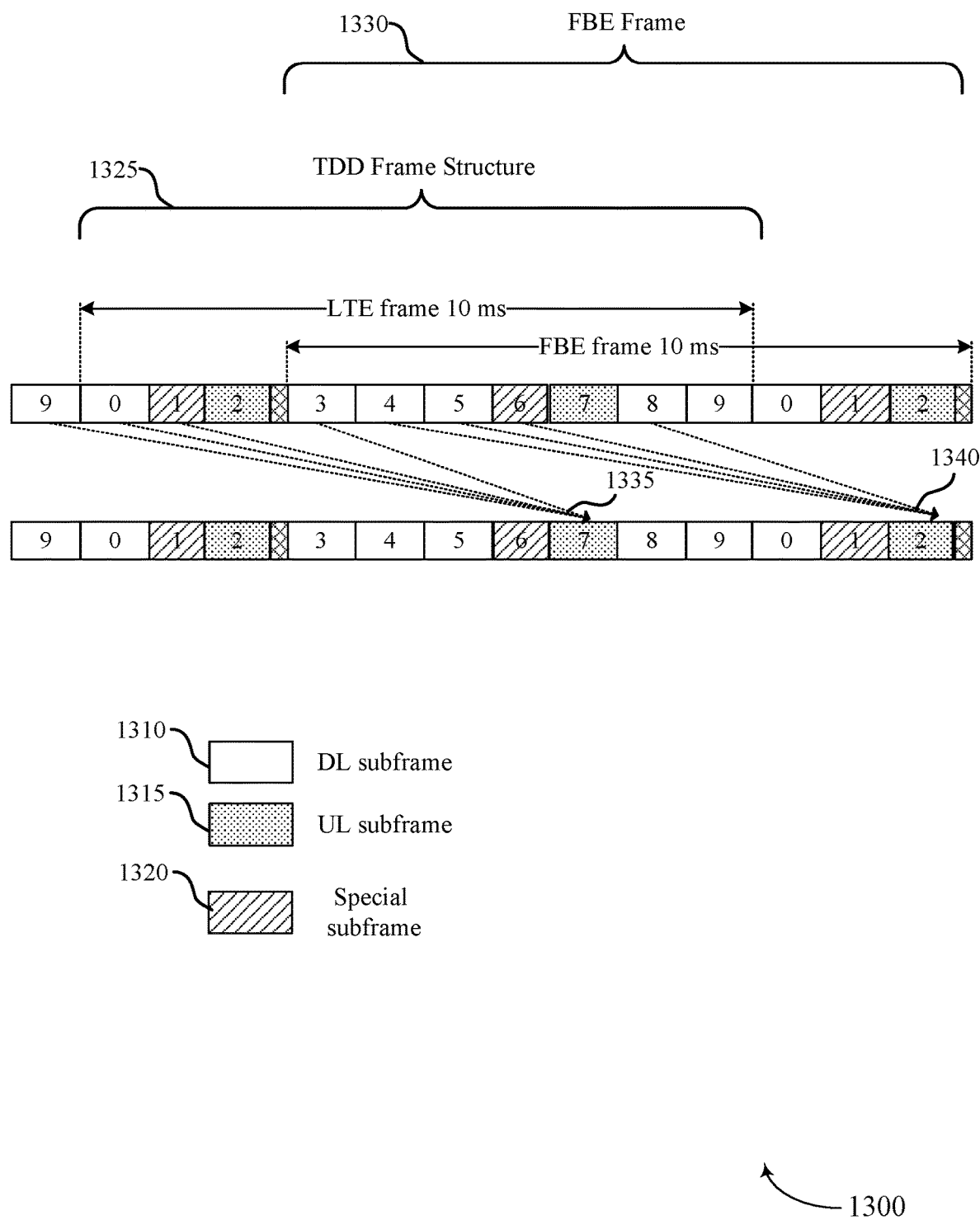
FIG. 13 illustrates another example of downlink ACK/NACK feedback timing that supports time division duplexing techniques in shared radio frequency spectrum in accordance with aspects of the present disclosure.

FIG. 13 illustrates an example of downlink ACK/NACK feedback timing 1300 that supports time division duplexing techniques in shared radio frequency spectrum in accordance with aspects of the present disclosure. In some examples, downlink ACK/NACK feedback timing 1300 may implement aspects of wireless communications system 100 or 200.

In the example of FIG. 13, ACK/NACK feedback timing 1300 is illustrated for the example of FIG. 12, in which an LBT gap and optionally an idle period may be configured in subframe 2 via configuring a TA at the UE 115 to provide the gap. In this example, TDD configuration 2 is illustrated which includes downlink subframes 1310, uplink subframes 1315, and special subframes 1320. The TDD frame structure 1325 and FBE frame 1330 are offset, and in this example the FBE frame 1330 starts at subframe 3 of the TDD frame structure 1325, and continues through subframe 2 of a subsequent TDD frame. In this example, the downlink feedback timeline may re-use the downlink HARQ timeline as in TDD-LTE, thus allowing the shared spectrum operation to be transparent to the UE 115. In TDD configuration 2, only PDSCH transmissions in subframe 0, 1, and 9 require uplink feedback 1335 in a subsequent FBE frame while PDSCH transmissions in other downlink subframes are self-contained within the same FBE frame in uplink feedback 1335 or 1340. In cases where the base station 105 fails LBT for the subsequent FBE frame, the UE 115 may transmit any remaining ACK/NACK feedback in a CET.

Figure 14:
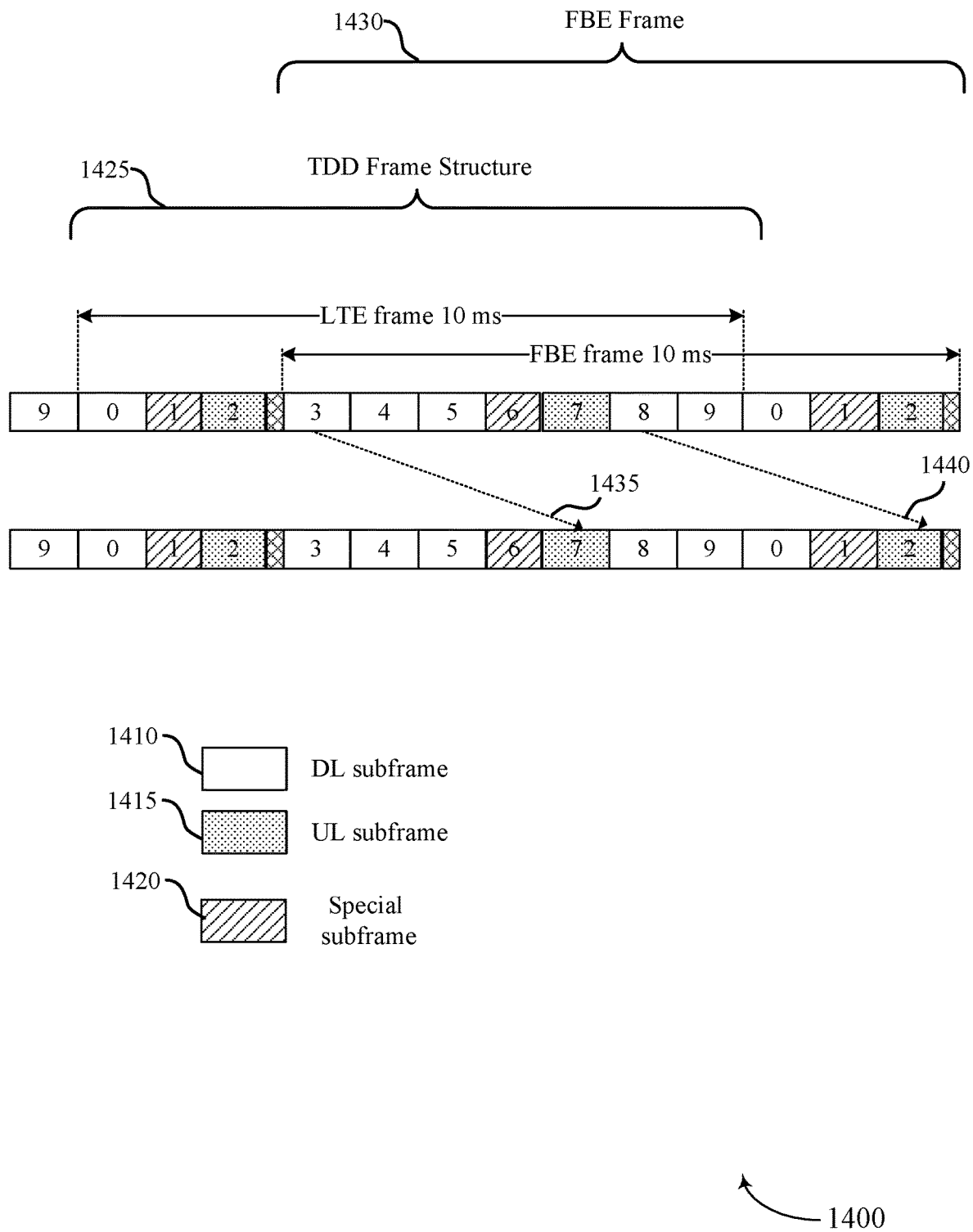
FIG. 14 illustrates another example of uplink ACK/NACK feedback timing that supports time division duplexing techniques in shared radio frequency spectrum in accordance with aspects of the present disclosure.

FIG. 14 illustrates another example of an uplink ACK/NACK feedback timing 1400 that supports time division duplexing techniques in shared radio frequency spectrum in accordance with aspects of the present disclosure. In some examples, uplink ACK/NACK feedback timing 1400 may implement aspects of wireless communications system 100 or 200.

In the example of FIG. 14, uplink ACK/NACK feedback timing 1400 is illustrated for the example of FIG. 12, in which an LBT gap and optionally an idle period may be configured in subframe 2 via configuring a TA at the UE 115 to provide the gap. In this example, TDD configuration 2 is illustrated which includes downlink subframes 1410, uplink subframes 1415, and special subframes 1420. The TDD frame structure 1425 and FBE frame 1430 are offset, and in this example the FBE frame 1430 starts at subframe 3 of the TDD frame structure 1425, and continues through subframe 2 of a subsequent TDD frame. In this example, the uplink feedback timeline may re-use the HARQ timeline as in TDD-LTE, thus allowing the shared spectrum operation to be transparent to the UE 115. In such cases, uplink grants and the uplink transmissions are always self-contained within the same FBE frame. In cases where the base station 105 does not have medium access in the next FBE frame, it will not transmit physical HARQ indicator channel (PHICH) or an uplink grant, and the UE 115 will simply hold its data in buffer and wait for PHICH or grant to transmit feedback 1435 and 1440. The PUSCH grant for subframes 2 and 7 and the corresponding PUSCH transmission are always self-contained within the same FBE frame.

Figure 15:
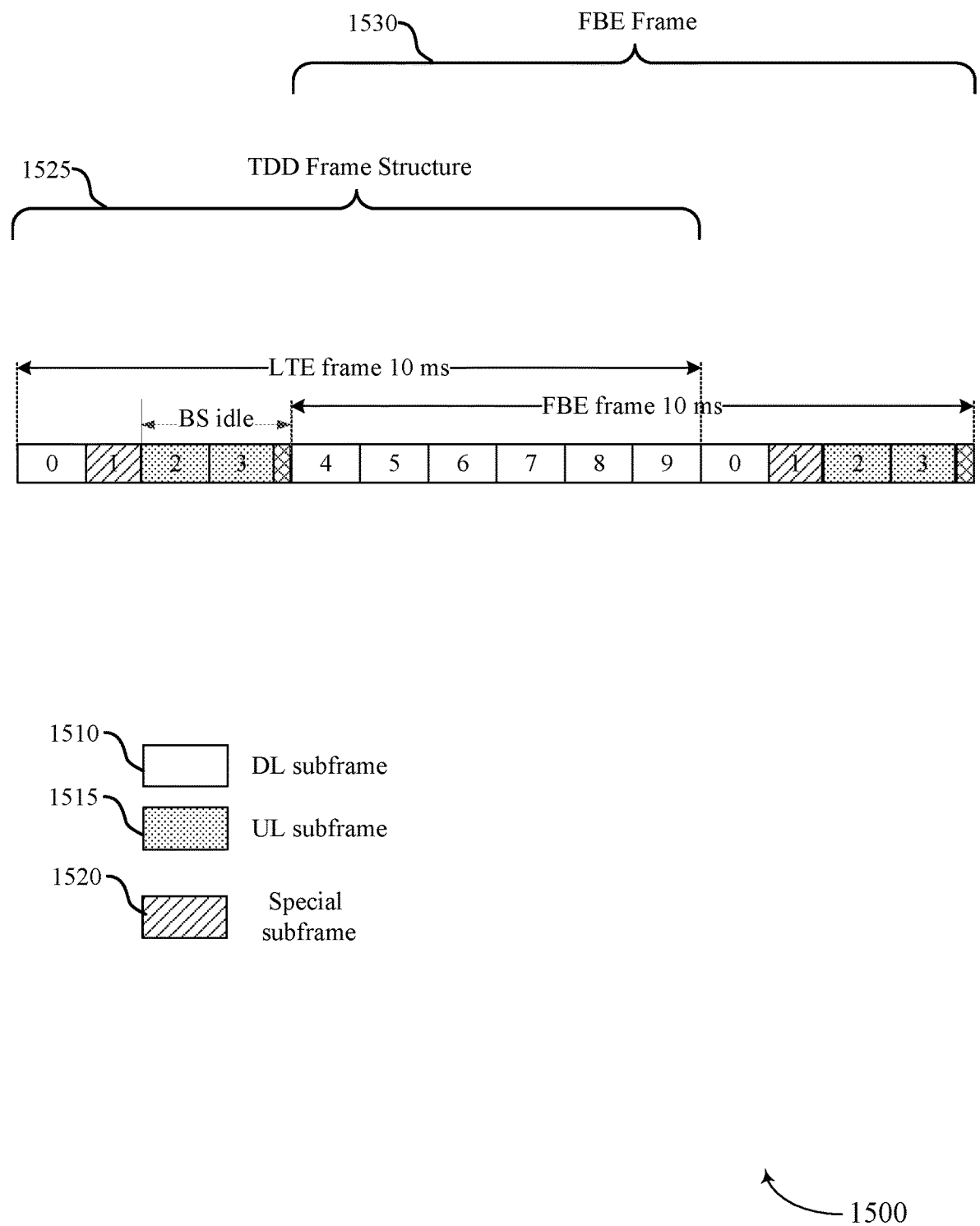
FIG. 15 illustrates another example of offset TDD and FBE frames that supports time division duplexing techniques in shared radio frequency spectrum in accordance with aspects of the present disclosure.

FIG. 15 illustrates another example of offset TDD and FBE frames 1500 that support time division duplexing techniques in shared radio frequency spectrum in accordance with aspects of the present disclosure. In some examples, offset TDD and FBE frames 1500 may implement aspects of wireless communications system 100 or 200. In this example, a TDD configuration 4 is illustrated which includes downlink subframes 1510, uplink subframes 1515, and special subframes 1520. The TDD frame structure 1525 and FBE frame 1530 are offset, and in this example the FBE frame 1530 starts at subframe 4 of the TDD frame structure 1525, and continues through subframe 3 of a subsequent TDD frame.

In this example, an LBT gap is created at the end of the 'U' subframe 3 in the TDD frame structure 1525. In some cases, the LBT gap is created by introducing additional TA at the UE 115 starting at special subframe 1520. Additionally, the base station 105 may be scheduled to be idle during subframe 3, which may satisfy the FBE idle time requirement prior to the start of downlink transmissions if the LBT passes. The base station 105 may perform single shot medium sensing (e.g., LBT or CCA) prior to the next FBE boundary at the start of FBE frame 1530.

Figure 16:
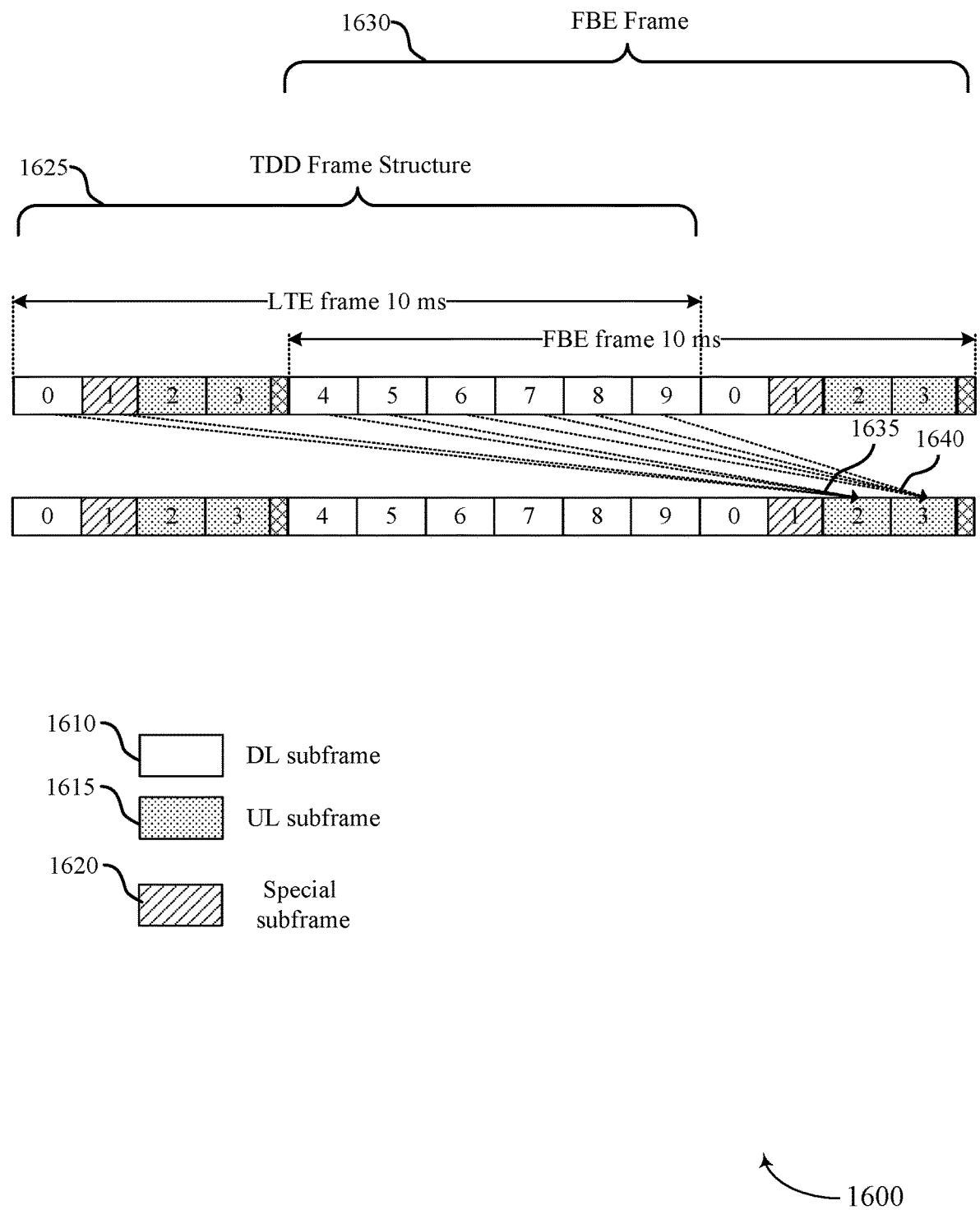
FIG. 16 illustrates another example of downlink ACK/NACK feedback timing that supports time division duplexing techniques in shared radio frequency spectrum in accordance with aspects of the present disclosure.

FIG. 16 illustrates another example of downlink ACK/NACK feedback timing 1600 that supports time division duplexing techniques in shared radio frequency spectrum in accordance with aspects of the present disclosure. In some examples, downlink ACK/NACK feedback timing 1600 may implement aspects of wireless communications system 100 or 200.

In the example of FIG. 16, ACK/NACK feedback timing 1600 is illustrated for the example of FIG. 15, in which an LBT gap and optionally an idle period may be configured in subframe 3 via configuring a TA at the UE 115 to provide the gap. In this example, TDD configuration 4 is illustrated which includes downlink subframes 1610, uplink subframes 1615, and special subframes 1620. The TDD frame structure 1625 and FBE frame 1630 are offset, and in this example the FBE frame 1630 starts at subframe 4 of the TDD frame structure 1625, and continues through subframe 3 of a subsequent TDD frame. In this example, the downlink feedback timeline may re-use the downlink HARQ timeline as in TDD-LTE, thus allowing the shared spectrum operation to be transparent to the UE 115. In TDD configuration 4, only PDSCH transmissions in subframe 0 and 1 require uplink feedback 1635 in a subsequent FBE frame while PDSCH transmissions in other downlink subframes are self-contained within the same FBE frame in uplink feedback 1635 or 1640. In cases where the base station 105 fails LBT for the subsequent FBE frame, the UE 115 may transmit any remaining ACK/NACK feedback in a CET.

Figure 17:
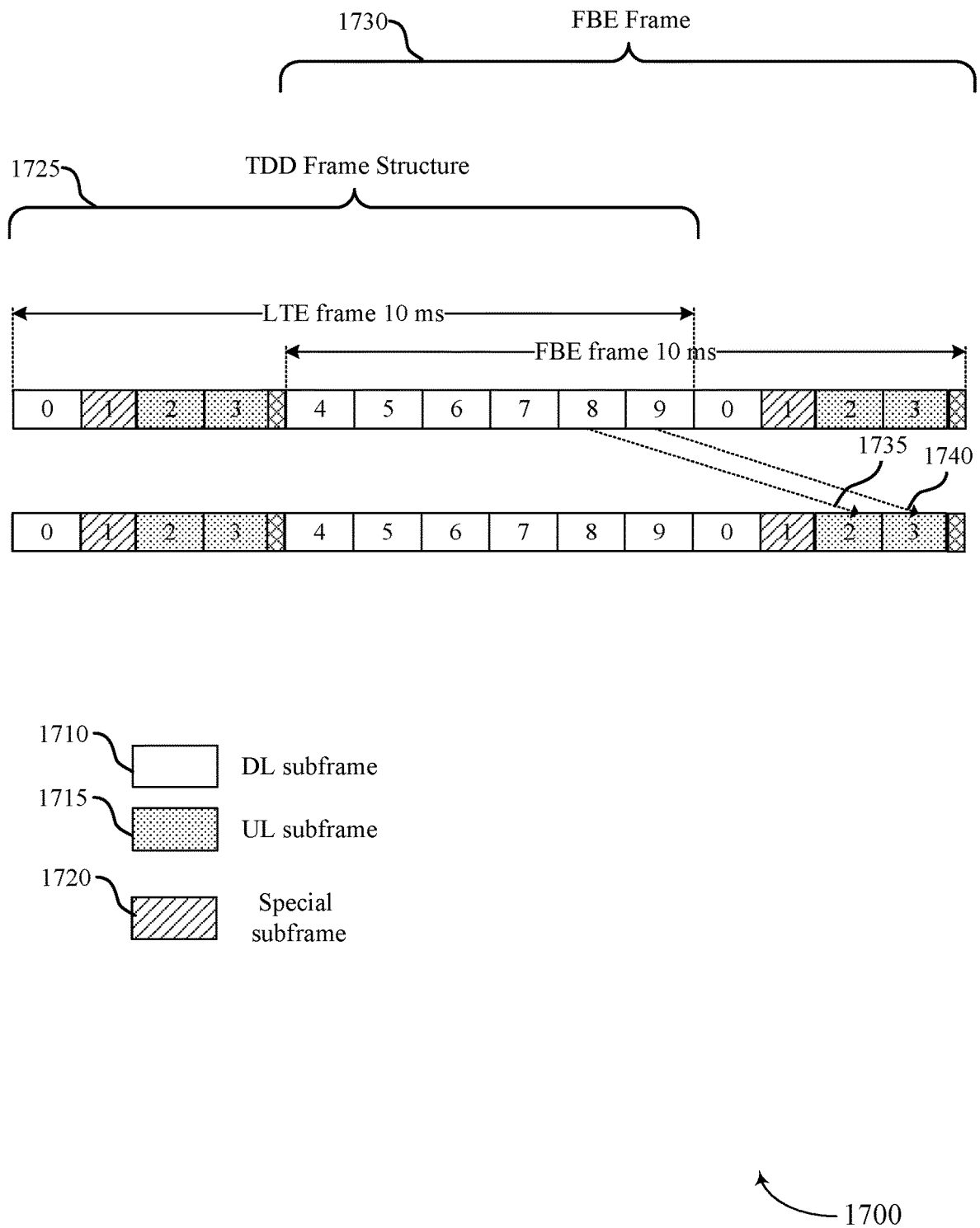
FIG. 17 illustrates another example of uplink ACK/NACK feedback timing that supports time division duplexing techniques in shared radio frequency spectrum in accordance with aspects of the present disclosure.

FIG. 17 illustrates an example of an uplink ACK/NACK feedback timing 1700 that supports time division duplexing techniques in shared radio frequency spectrum in accordance with aspects of the present disclosure. In some examples, uplink ACK/NACK feedback timing 1700 may implement aspects of wireless communications system 100 or 200.

In the example of FIG. 17, uplink ACK/NACK feedback timing 1700 is illustrated for the example of FIG. 15, in which an LBT gap and optionally an idle period may be configured in subframe 3 via configuring a TA at the UE 115 to provide the gap. In this example, TDD configuration 4 is illustrated which includes downlink subframes 1710, uplink subframes 1715, and special subframes 1720. The TDD frame structure 1725 and FBE frame 1730 are offset, and in this example the FBE frame 1730 starts at subframe 4 of the TDD frame structure 1725, and continues through subframe 3 of a subsequent TDD frame. In this example, the uplink feedback timeline may re-use the HARQ timeline as in TDD-LTE, thus allowing the shared spectrum operation to be transparent to the UE 115. In such cases, uplink grants and the uplink transmissions are always self-contained within the same FBE frame. In cases where the base station 105 does not have medium access in the next FBE frame, it will not transmit physical HARQ indicator channel (PHICH) or an uplink grant, and the UE 115 will simply hold its data in buffer and wait for PHICH or grant to transmit feedback 1735 and 1740. The PUSCH grant for subframes 2 and 3 and the corresponding PUSCH transmission are always self-contained within the same FBE frame.

Figure 18:
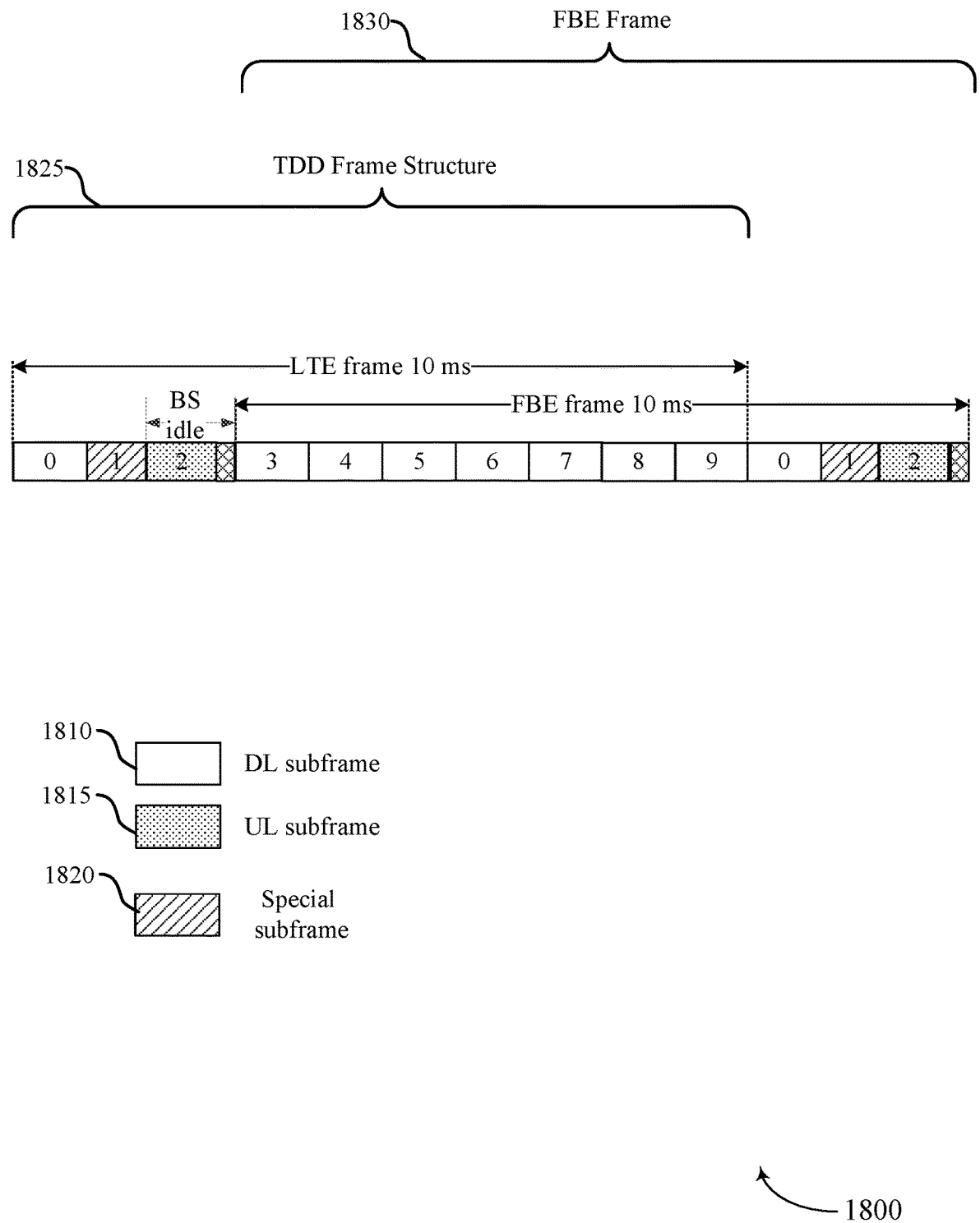
FIG. 18 illustrates another example of offset TDD and FBE frames that supports time division duplexing techniques in shared radio frequency spectrum in accordance with aspects of the present disclosure.

FIG. 18 illustrates another example of offset TDD and FBE frames 1800 that supports time division duplexing techniques in shared radio frequency spectrum in accordance with aspects of the present disclosure. In some examples, offset TDD and FBE frames 1800 may implement aspects of wireless communications system 100 or 200. In this example, a TDD configuration 5 is illustrated which includes downlink subframes 1810, uplink subframes 1815, and special subframes 1820. The TDD frame structure 1825 and FBE frame 1830 are offset, and in this example the FBE frame 1830 starts at subframe 3 of the TDD frame structure 1825, and continues through subframe 2 of a subsequent TDD frame.

In this example, an LBT gap is created at the end of the 'U' subframe 2 in the TDD frame structure 1825. In some cases, the LBT gap is created by introducing additional TA at the UE 115 starting at special subframe 1820. Additionally, the base station 105 may be scheduled to be idle during subframe 2, which may satisfy the FBE idle time requirement prior to the start of downlink transmissions if the LBT passes. The base station 105 may perform single shot medium sensing (e.g., LBT or CCA) prior to the next FBE boundary at the start of FBE frame 1830.

Figure 19:
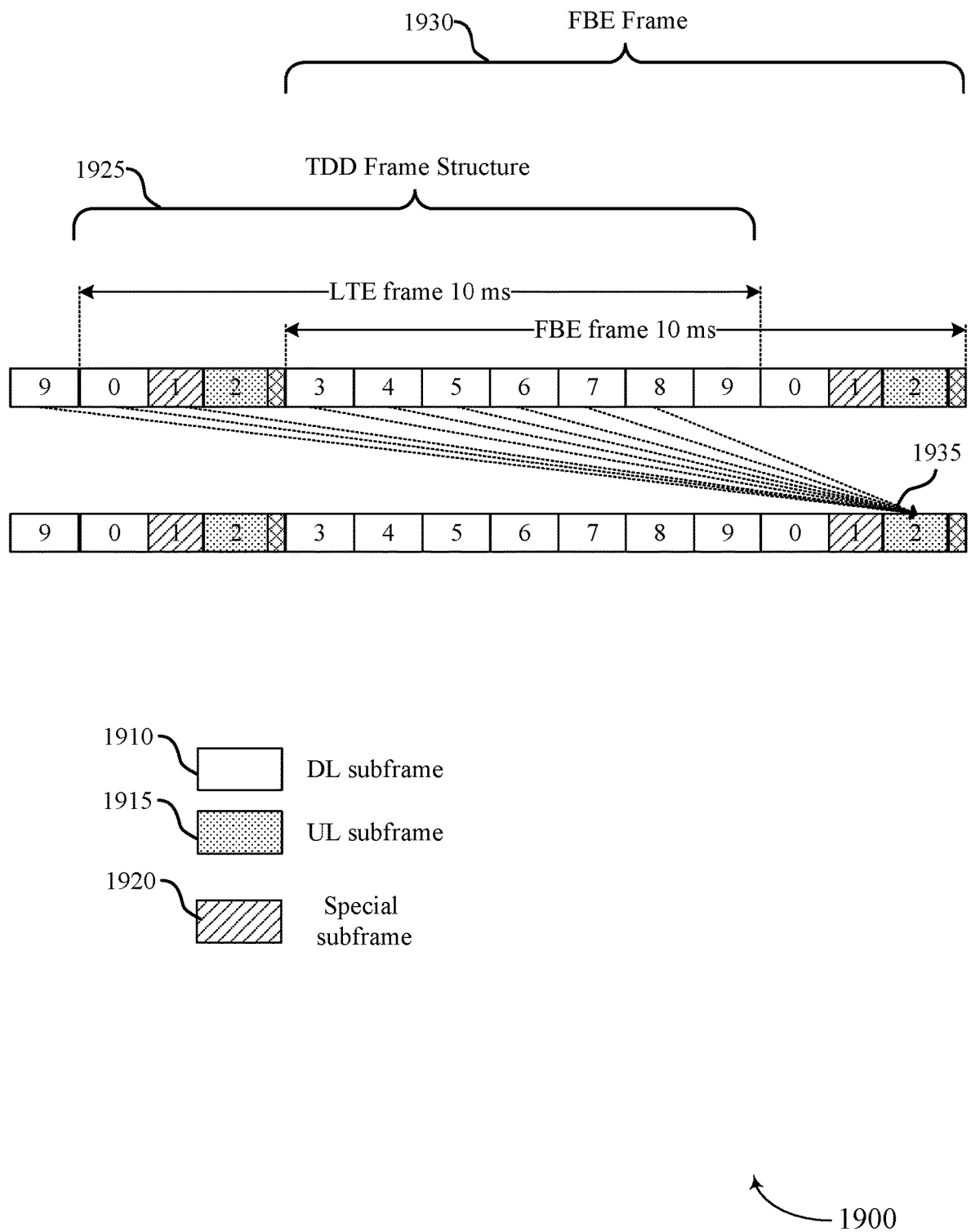
FIG. 19 illustrates another example of downlink ACK/NACK feedback timing that supports time division duplexing techniques in shared radio frequency spectrum in accordance with aspects of the present disclosure.

FIG. 19 illustrates an example of a downlink ACK/NACK feedback timing 1900 that supports time division duplexing techniques in shared radio frequency spectrum in accordance with aspects of the present disclosure. In some examples, downlink ACK/NACK feedback timing 1900 may implement aspects of wireless communications system 100 or 200.

In the example of FIG. 19, ACK/NACK feedback timing 1900 is illustrated for the example of FIG. 18, in which an LBT gap and optionally an idle period may be configured in subframe 2 via configuring a TA at the UE 115 to provide the gap. In this example, TDD configuration 5 is illustrated which includes downlink subframes 1910, uplink subframes 1915, and special subframes 1920. The TDD frame structure 1925 and FBE frame 1930 are offset, and in this example the FBE frame 1930 starts at subframe 3 of the TDD frame structure 1925, and continues through subframe 2 of a subsequent TDD frame. In this example, the downlink feedback timeline may re-use the downlink HARQ timeline as in TDD-LTE, thus allowing the shared spectrum operation to be transparent to the UE 115. In TDD configuration 5, only PDSCH transmissions in subframe 0, 1, and 9 require uplink feedback 1935 in a subsequent FBE frame while PDSCH transmissions in other downlink subframes are self-contained within the same FBE frame in uplink feedback 1935. In cases where the base station 105 fails LBT for the subsequent FBE frame, the UE 115 may transmit any remaining ACK/NACK feedback in a CET.

Figure 20:
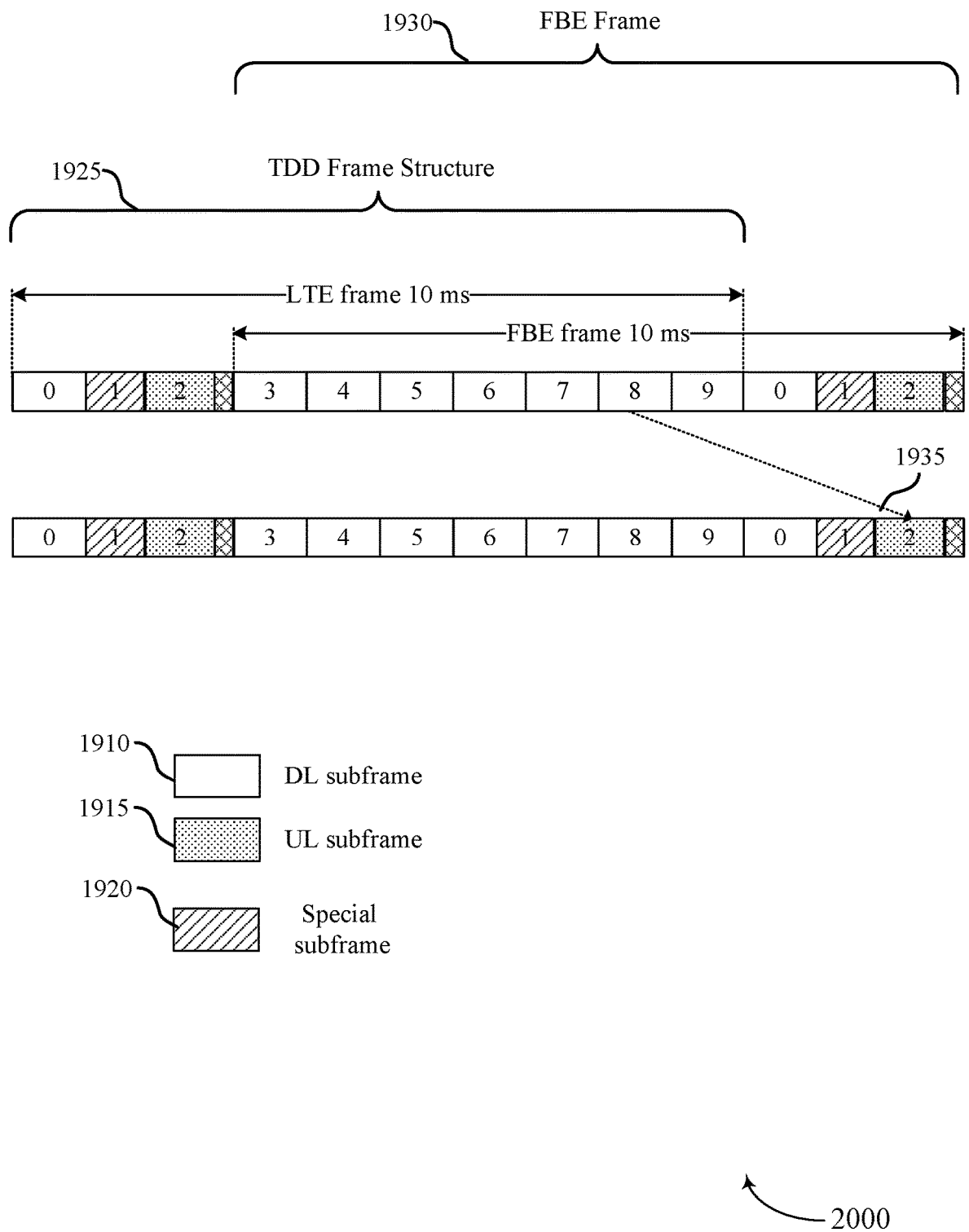
FIG. 20 illustrates another example of uplink ACK/NACK feedback timing that supports time division duplexing techniques in shared radio frequency spectrum in accordance with aspects of the present disclosure.

FIG. 20 illustrates an example of an uplink ACK/NACK feedback timing 2000 that supports time division duplexing techniques in shared radio frequency spectrum in accordance with aspects of the present disclosure. In some examples, uplink ACK/NACK feedback timing 2000 may implement aspects of wireless communications system 100 or 200.

In the example of FIG. 20, uplink ACK/NACK feedback timing 2000 is illustrated for the example of FIG. 18, in which an LBT gap and optionally an idle period may be configured in subframe 2 via configuring a TA at the UE 115 to provide the gap. In this example, TDD configuration 5 is illustrated which includes downlink subframes 2010, uplink subframes 2015, and special subframes 2020. The TDD frame structure 2025 and FBE frame 2030 are offset, and in this example the FBE frame 2030 starts at subframe 3 of the TDD frame structure 2025, and continues through subframe 2 of a subsequent TDD frame. In this example, the uplink feedback timeline may re-use the HARQ timeline as in TDD-LTE, thus allowing the shared spectrum operation to be transparent to the UE 115. In such cases, uplink grants and the uplink transmissions are always self-contained within the same FBE frame. In cases where the base station 105 does not have medium access in the next FBE frame, it will not transmit physical HARQ indicator channel (PHICH) or an uplink grant, and the UE 115 will simply hold its data in buffer and wait for PHICH or grant to transmit feedback 2035 and 2040. The PUSCH grant for subframe 2 and the corresponding PUSCH transmission are always self-contained within the same FBE frame.

Figure 21:
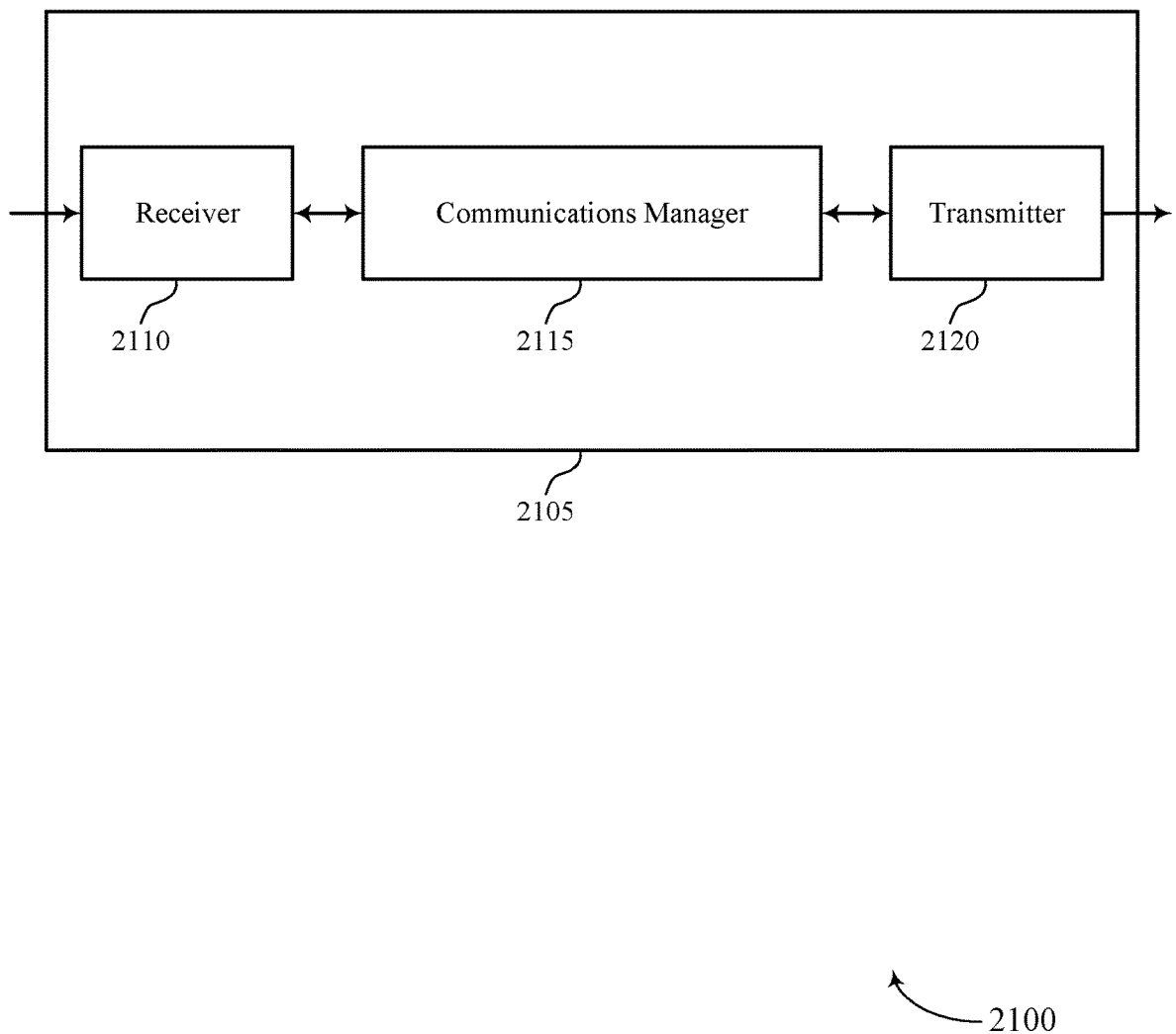
FIGS. 21 and 22 show block diagrams of devices that support time division duplexing techniques in shared radio frequency spectrum in accordance with aspects of the present disclosure.

FIG. 21 shows a block diagram 2100 of a device 2105 that supports time division duplexing techniques in shared radio frequency spectrum in accordance with aspects of the present disclosure. The device 2105 may be an example of aspects of a base station 105 as described herein. The device 2105 may include a receiver 2110, a communications manager 2115, and a transmitter 2120. The device 2105 may also include a processor. Each of these components may be in communication with one another (e.g., via one or more buses).

The receiver 2110 may receive information such as packets, user data, or control information associated with various information channels (e.g., control channels, data channels, and information related to time division duplexing techniques in shared radio frequency spectrum, etc.). Information may be passed on to other components of the device 2105. The receiver 2110 may be an example of aspects of the transceiver 2420 described with reference to FIG. 24. The receiver 2110 may utilize a single antenna or a set of antennas.

The communications manager 2115 may select a TDD frame structure for communicating with a UE 115 via a shared radio frequency spectrum, the TDD frame structure including one or more downlink subframes, one or more uplink subframes, and one or more special subframes, determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame, perform an LBT procedure prior to the FBE frame starting location, and initiate transmissions with the UE 115 responsive to a successful LBT procedure, where the transmissions start at the FBE frame starting location and the first FBE frame extend into a second TDD frame having the TDD frame structure. The communications manager 2115 may be an example of aspects of the communications manager 2410 described herein. One implementation is "selecting a TDD frame structure for communicating with a UE via a shared radio frequency spectrum, the TDD frame structure including one or more downlink subframes, one or more uplink subframes, and one or more special subframes, determining an FBE frame starting location for a first FBE frame within a first TDD frame having the TDD frame structure, wherein the FBE frame starting location is offset from an initial subframe of the first TDD frame and aligned with a subsequent subframe boundary of a first downlink subframe that is subsequent to the initial subframe and within the first TDD frame, performing an LBT procedure prior to the FBE frame starting location, and initiating transmissions with the UE responsive to a successful LBT procedure, wherein the transmissions start at the FBE frame starting location and the first FBE frame extend into a second TDD frame having the TDD frame structure." This implementation may be used to configure a TDD frame structure such that a UE 115 does not need to perform an LBT procedure, and thus the LBT process may be transparent to the UE 115, allowing UEs 115 that are not specially configured to operate using an LBT procedure to use the shared radio frequency spectrum for communications. One example of an advantage of "configuring a preceding subframe to the first downlink subframe within the TDD frame structure as a multimedia broadcast single frequency network (MBSFN) subframe, and transmitting control signaling during only a portion of the MBSFN subframe" is that a base station 105 may use an LBT gap period for sensing while a first downlink subframe of a downlink burst of the first TDD frame may be used as an idle period and an uplink transmission may start at a second downlink subframe of the downlink burst of the first TDD frame. An advantage of "configuring a preceding subframe to the first downlink subframe within the TDD frame structure to provide an LBT sensing period for performing the LBT procedure, and configuring the UE with a timing advance that results in uplink transmissions within the preceding subframe finishing prior to a start of the LBT sensing period" is that the base station 105 may perform sensing during the LBT sensing period without uplink interference from the UE 115. An advantage of "wherein the transmission gap further provides an idle period prior to the FBE frame starting location, and wherein the TDD frame structure is selected to provide a guard period within the one or more special subframes that meets or exceeds an idle time threshold," is that the base station 105 may remain idle during an LBT gap period, but still perform CCA prior to the FBE frame.

The communications manager 2115, or its sub-components, may be implemented in hardware, code (e.g., software or firmware) executed by a processor, or any combination thereof. If implemented in code executed by a processor, the functions of the communications manager 2115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 2115, or its sub-components, may be physically located at various positions, including being distributed such that portions of functions are implemented at different physical locations by one or more physical components. In some examples, the communications manager 2115, or its sub-components, may be a separate and distinct component in accordance with various aspects of the present disclosure. In some examples, the communications manager 2115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2120 may transmit signals generated by other components of the device 2105. In some examples, the transmitter 2120 may be collocated with a receiver 2110 in a transceiver module. For example, the transmitter 2120 may be an example of aspects of the transceiver 2420 described with reference to FIG. 24. The transmitter 2120 may utilize a single antenna or a set of antennas.

Figure 22:
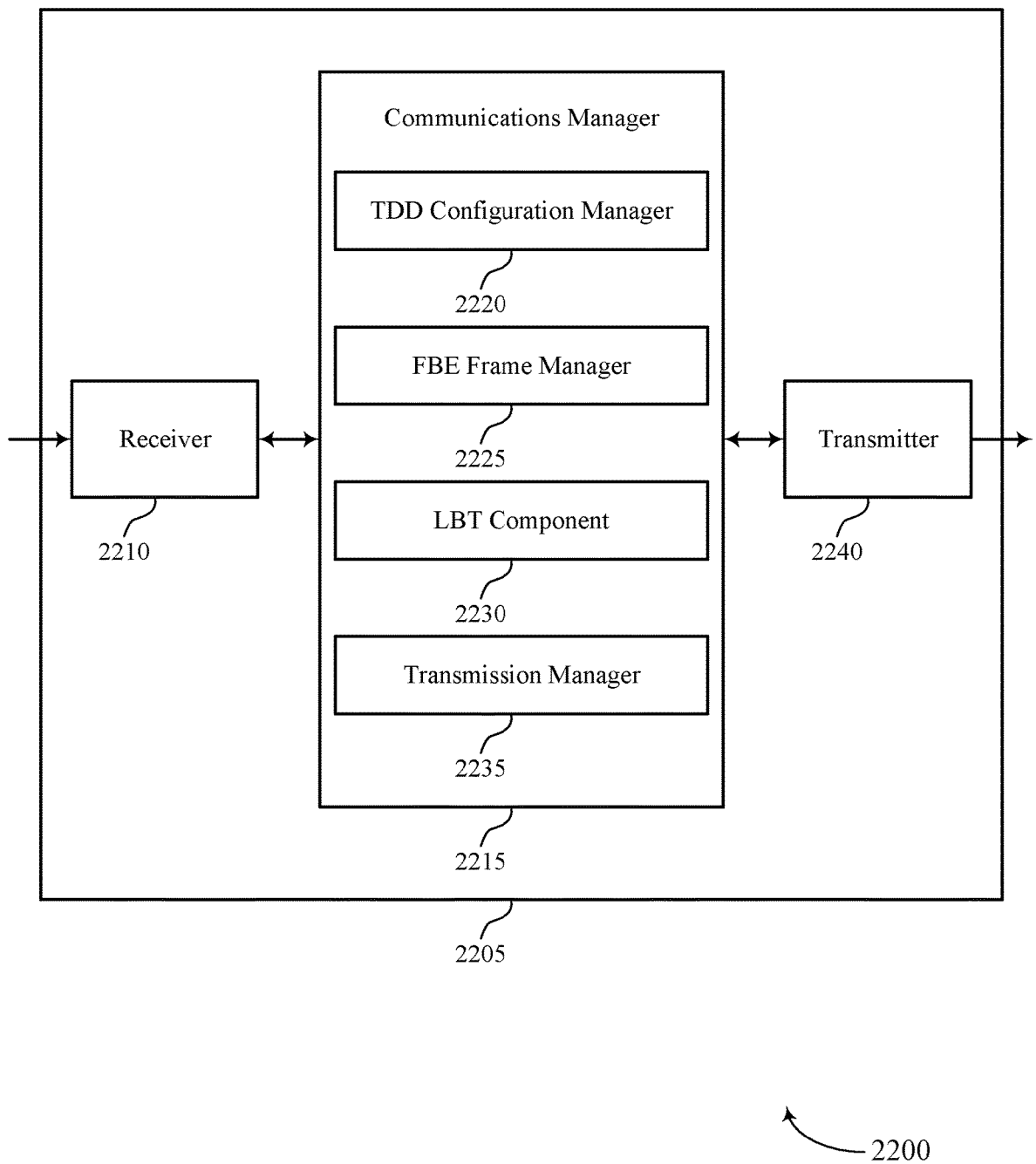

FIG. 22 shows a block diagram 2200 of a device 2205 that supports time division duplexing techniques in shared radio frequency spectrum in accordance with aspects of the present disclosure. The device 2205 may be an example of aspects of a device 2105 or a base station 105 as described herein. The device 2205 may include a receiver 2210, a communications manager 2215, and a transmitter 2240. The device 2205 may also include a processor. Each of these components may be in communication with one another (e.g., via one or more buses).

The receiver 2210 may receive information such as packets, user data, or control information associated with various information channels (e.g., control channels, data channels, and information related to time division duplexing techniques in shared radio frequency spectrum, etc.). Information may be passed on to other components of the device 2205. The receiver 2210 may be an example of aspects of the transceiver 2420 described with reference to FIG. 24. The receiver 2210 may utilize a single antenna or a set of antennas.

The communications manager 2215 may be an example of aspects of the communications manager 2115 as described herein. The communications manager 2215 may include a TDD configuration manager 2220, a FBE frame manager 2225, an LBT component 2230, and a transmission manager 2235. The communications manager 2215 may be an example of aspects of the communications manager 2410 described herein.

The TDD configuration manager 2220 may select a TDD frame structure for communicating with a UE 115 via a shared radio frequency spectrum, the TDD frame structure including one or more downlink subframes, one or more uplink subframes, and one or more special subframes.

The FBE frame manager 2225 may determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame.

The LBT component 2230 may perform an LBT procedure (e.g., a CCA) prior to the FBE frame starting location.

The transmission manager 2235 may initiate transmissions with the UE 115 responsive to a successful LBT procedure, where the transmissions start at the FBE frame starting location and the first FBE frame extend into a second TDD frame having the TDD frame structure.

The transmitter 2240 may transmit signals generated by other components of the device 2205. In some examples, the transmitter 2240 may be collocated with a receiver 2210 in a transceiver module. For example, the transmitter 2240 may be an example of aspects of the transceiver 2420 described with reference to FIG. 24. The transmitter 2240 may utilize a single antenna or a set of antennas.

Figure 23:
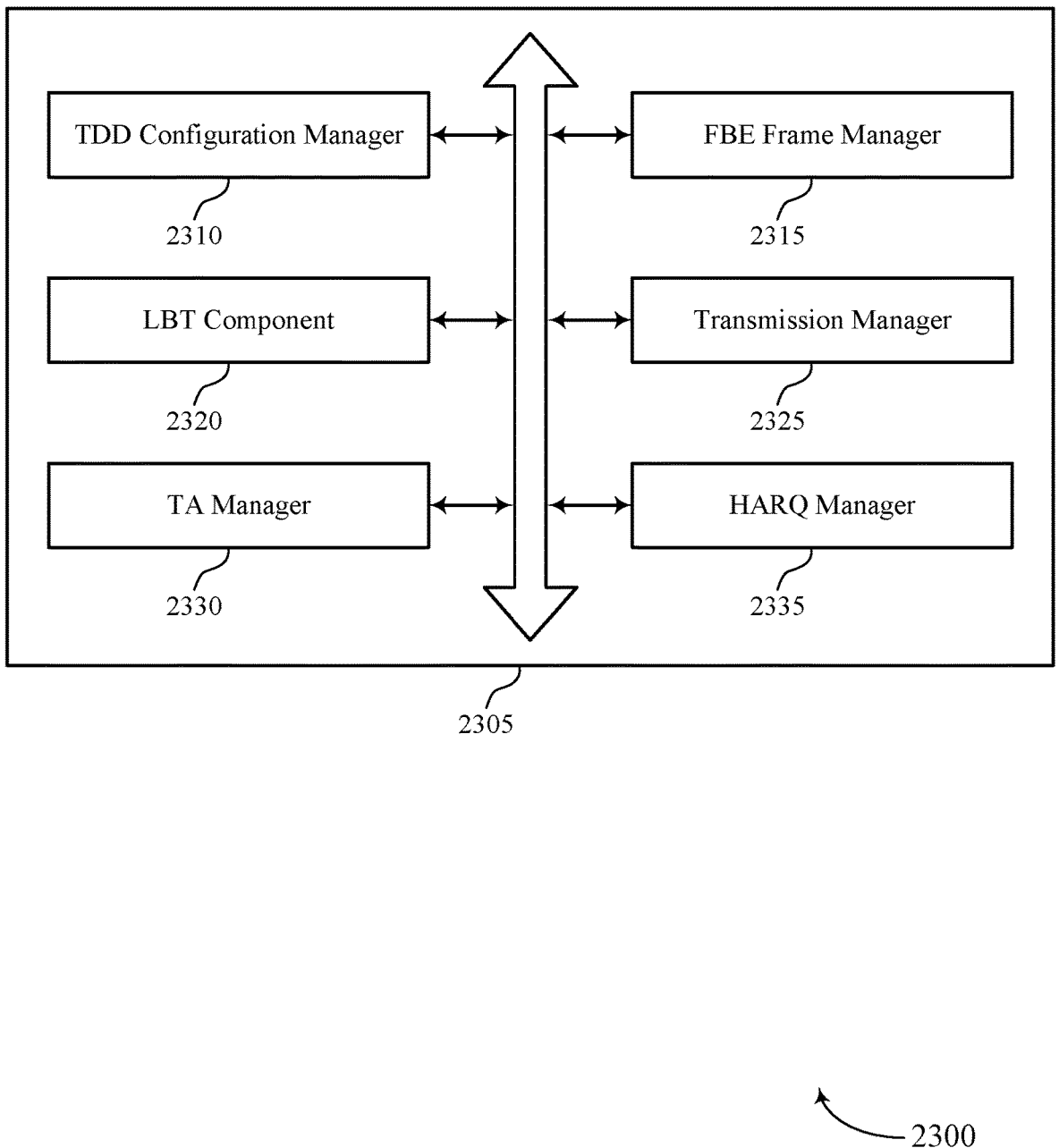
FIG. 23 shows a block diagram of a communications manager that supports time division duplexing techniques in shared radio frequency spectrum in accordance with aspects of the present disclosure.

FIG. 23 shows a block diagram 2300 of a communications manager 2305 that supports time division duplexing techniques in shared radio frequency spectrum in accordance with aspects of the present disclosure. The communications manager 2305 may be an example of aspects of a communications manager 2115, a communications manager 2215, or a communications manager 2410 described herein. The communications manager 2305 may include a TDD configuration manager 2310, a FBE frame manager 2315, an LBT component 2320, a transmission manager 2325, a TA manager 2330, and a HARQ manager 2335. Each of these modules may communicate, directly or indirectly, with one another (e.g., via one or more buses).

The TDD configuration manager 2310 may select a TDD frame structure for communicating with a UE 115 via a shared radio frequency spectrum, the TDD frame structure including one or more downlink subframes, one or more uplink subframes, and one or more special subframes. In some examples, the TDD configuration manager 2310 may configure a preceding subframe to the first downlink subframe within the TDD frame structure to provide a transmission gap prior to the FBE frame starting location. In some examples, the TDD configuration manager 2310 may configure the UE 115 with a timing advance that provides a duration of the guard period that is shorter than an LBT gap threshold.

In some examples, the TDD configuration manager 2310 may configure a preceding subframe to the first downlink subframe within the TDD frame structure as a multimedia broadcast single frequency network (MBSFN) subframe. In some examples, the TDD configuration manager 2310 may transmit control signaling during only a portion of the MBSFN subframe. In some cases, the transmission gap provides an idle period prior to the FBE frame starting location.

In some cases, the first downlink subframe is a second subframe in time of a downlink subframe burst and the preceding subframe to the first downlink subframe is a first downlink subframe in time of the downlink subframe burst. In some cases, the first downlink subframe is a first subframe in time of a last downlink subframe burst of the selected TDD configuration.

The FBE frame manager 2315 may determine a frame based equipment (FBE) frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame.

The LBT component 2320 may perform an LBT procedure prior to the FBE frame starting location. In some examples, the LBT component 2320 may perform a second LBT procedure prior to a subsequent second FBE frame starting location within the second TDD frame, and a third LBT procedure prior to a subsequent third FBE frame starting location within the third TDD frame.

The transmission manager 2325 may initiate transmissions with the UE 115 responsive to a successful LBT procedure, where the transmissions start at the FBE frame starting location and the first FBE frame extend into a second TDD frame having the TDD frame structure. In some examples, the transmission manager 2325 may continue transmissions with the UE 115 responsive to a successful second LBT procedure during the second TDD frame and into a third TDD frame having the TDD frame structure. In some examples, the transmission manager 2325 may discontinue transmissions with the UE 115 responsive to an unsuccessful third LBT procedure during the third TDD frame.

The TA manager 2330 may configure a preceding subframe to the first downlink subframe within the TDD frame structure to provide an LBT sensing period for performing the LBT procedure. In some examples, the TA manager 2330 may configure the UE 115 with a timing advance that results in uplink transmissions within the preceding subframe finishing prior to a start of the LBT sensing period. In some cases, the UE 115 initiates uplink transmissions in the one or more uplink symbols without performing an LBT procedure based on the duration of the guard period being shorter than the LBT gap threshold.

In some cases, the transmission gap further provides an idle period prior to the FBE frame starting location, and where the TDD frame structure is selected to provide a guard period within the one or more special subframes that meets or exceeds an idle time threshold. In some cases, the idle time threshold corresponds to five percent of a duration of the FBE frame, and where the duration of the FBE frame corresponds to a duration of the TDD frame structure.

The HARQ manager 2335 may receive one or more acknowledgment/negative-acknowledgment (ACK/NACK) feedback transmissions from the UE 115 during the first TDD frame, second TDD frame, and third TDD frame. In some examples, the HARQ manager 2335 may receive at least one additional ACK/NACK feedback transmission from the UE 115 after discontinuing transmissions with the UE 115 in an uplink transmission that is exempt from LBT procedures (e.g., via a control channel element (CCE) transmission).

Figure 24:
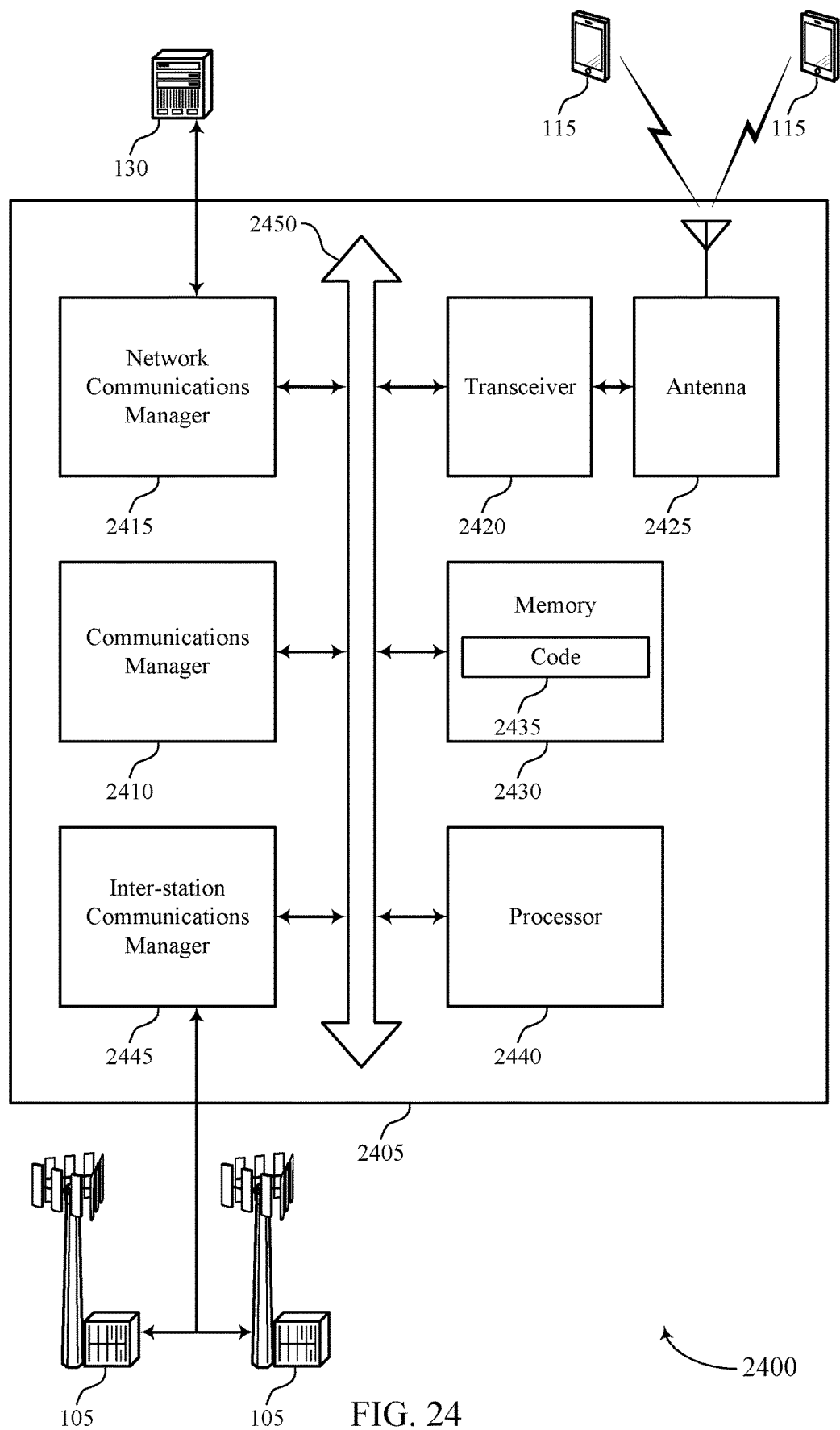
FIG. 24 shows a diagram of a system including a device that supports time division duplexing techniques in shared radio frequency spectrum in accordance with aspects of the present disclosure.

FIG. 24 shows a diagram of a system 2400 including a device 2405 that supports time division duplexing techniques in shared radio frequency spectrum in accordance with aspects of the present disclosure. The device 2405 may be an example of or include the components of device 2105, device 2205, or a base station 105 as described herein. The device 2405 may include components for bi-directional voice and data communications including components for transmitting and receiving communications, including a communications manager 2410, a network communications manager 2415, a transceiver 2420, an antenna 2425, memory 2430, a processor 2440, and an inter-station communications manager 2445. These components may be in electronic communication via one or more buses (e.g., bus 2450).

The communications manager 2410 may select a TDD frame structure for communicating with a UE 115 via a shared radio frequency spectrum, the TDD frame structure including one or more downlink subframes, one or more uplink subframes, and one or more special subframes, determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame, perform an LBT procedure prior to the FBE frame starting location, and initiate transmissions with the UE 115 responsive to a successful LBT procedure, where the transmissions start at the FBE frame starting location and the first FBE frame extend into a second TDD frame having the TDD frame structure.

The network communications manager 2415 may manage communications with the core network (e.g., via one or more wired backhaul links). For example, the network communications manager 2415 may manage the transfer of data communications for client devices, such as one or more UEs 115.

The transceiver 2420 may communicate bi-directionally, via one or more antennas, wired, or wireless links as described above. For example, the transceiver 2420 may represent a wireless transceiver and may communicate bi-directionally with another wireless transceiver. The transceiver 2420 may also include a modem to modulate the packets and provide the modulated packets to the antennas for transmission, and to demodulate packets received from the antennas.

In some cases, the wireless device 2405 may include a single antenna 2425. However, in some cases the device 2405 may have more than one antenna 2425, which may be capable of concurrently transmitting or receiving multiple wireless transmissions.

The memory 2430 may include RAM, ROM, or a combination thereof. The memory 2430 may store computer-readable code 2435 including instructions that, when executed by a processor (e.g., the processor 2440) cause the device 2405 to perform various functions described herein. In some cases, the memory 2430 may contain, among other things, a BIOS which may control basic hardware or software operation such as the interaction with peripheral components or devices.

The processor 2440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2440 may be configured to operate a memory array using a memory controller. In some cases, a memory controller may be integrated into processor 2440. The processor 2440 may be configured to execute computer-readable instructions stored in a memory (e.g., the memory 2430) to cause the device 2405 to perform various functions (e.g., functions or tasks supporting time division duplexing techniques in shared radio frequency spectrum).

The inter-station communications manager 2445 may manage communications with other base station 105, and may include a controller or scheduler for controlling communications with UEs 115 in cooperation with other base stations 105. For example, the inter-station communications manager 2445 may coordinate scheduling for transmissions to UEs 115 for various interference mitigation techniques such as beamforming or joint transmission. In some examples, the inter-station communications manager 2445 may provide an X2 interface within an LTE/LTE-A wireless communication network technology to provide communication between base stations 105.

The code 2435 may include instructions to implement aspects of the present disclosure, including instructions to support wireless communications. The code 2435 may be stored in a non-transitory computer-readable medium such as system memory or other type of memory. In some cases, the code 2435 may not be directly executable by the processor 2440 but may cause a computer (e.g., when compiled and executed) to perform functions described herein.

Figure 25:
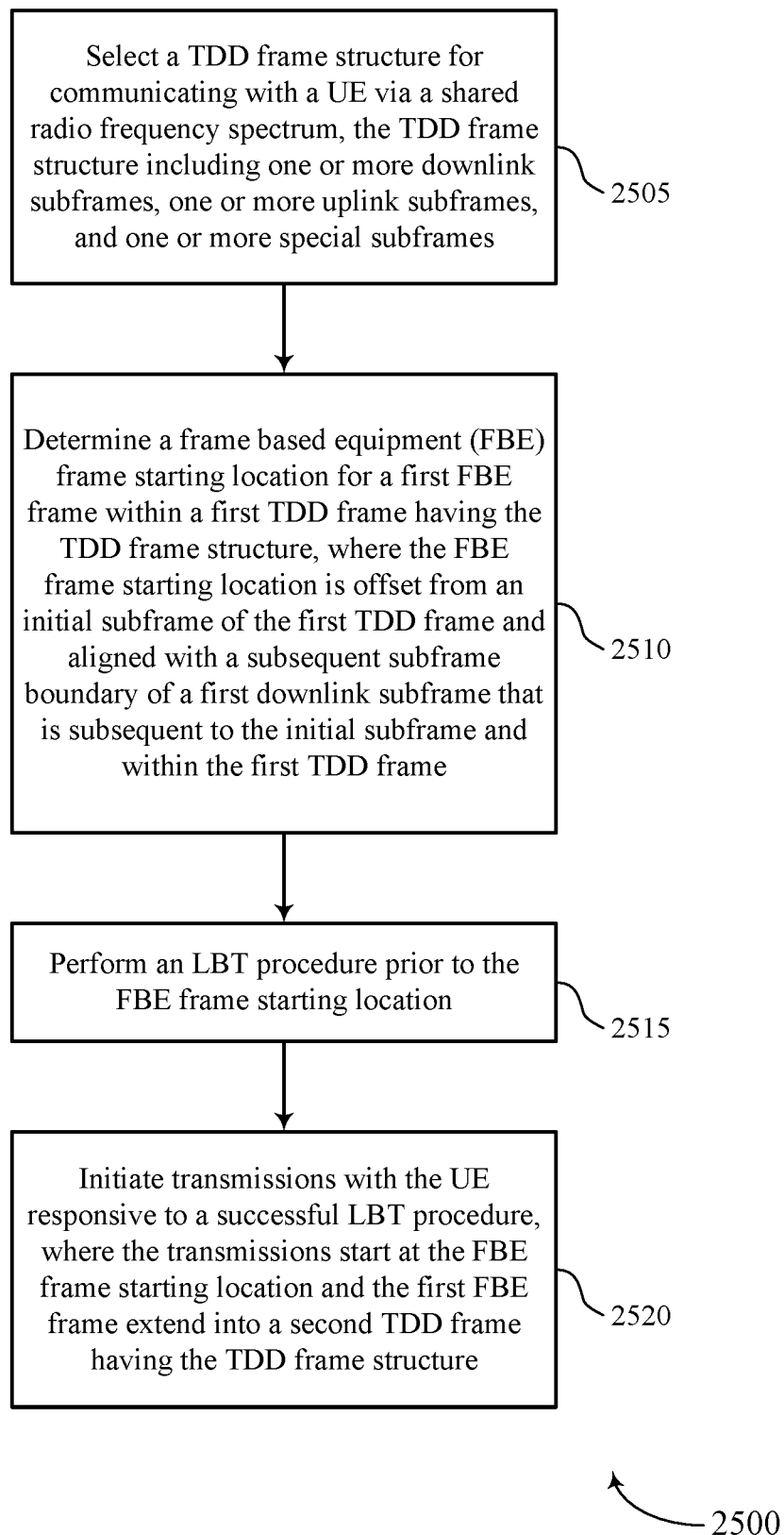
FIGS. 25 through 29 show flowcharts illustrating methods that support time division duplexing techniques in shared radio frequency spectrum in accordance with aspects of the present disclosure.

FIG. 25 shows a flowchart illustrating a method 2500 that supports time division duplexing techniques in shared radio frequency spectrum in accordance with aspects of the present disclosure. The operations of method 2500 may be implemented by a base station 105 or its components as described herein. For example, the operations of method 2500 may be performed by a communications manager as described with reference to FIGS. 21 through 24. In some examples, a base station 105 may execute a set of instructions to control the functional elements of the base station 105 to perform the functions described below. Additionally or alternatively, a base station 105 may perform aspects of the functions described below using special-purpose hardware.

At 2505, the base station 105 may select a TDD frame structure for communicating with a UE 115 via a shared radio frequency spectrum, the TDD frame structure including one or more downlink subframes, one or more uplink subframes, and one or more special subframes. The operations of 2505 may be performed according to the methods described herein. In some examples, aspects of the operations of 2505 may be performed by a TDD configuration manager as described with reference to FIGS. 21 through 24.

At 2510, the base station 105 may determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame. The operations of 2510 may be performed according to the methods described herein. In some examples, aspects of the operations of 2510 may be performed by a FBE frame manager as described with reference to FIGS. 21 through 24.

At 2515, the base station 105 may perform an LBT procedure prior to the FBE frame starting location. The operations of 2515 may be performed according to the methods described herein. In some examples, aspects of the operations of 2515 may be performed by an LBT component as described with reference to FIGS. 21 through 24.

At 2520, the base station 105 may initiate transmissions with the UE 115 responsive to a successful LBT procedure, where the transmissions start at the FBE frame starting location and the first FBE frame extend into a second TDD frame having the TDD frame structure. The operations of 2520 may be performed according to the methods described herein. In some examples, aspects of the operations of 2520 may be performed by a transmission manager as described with reference to FIGS. 21 through 24.

Figure 26:
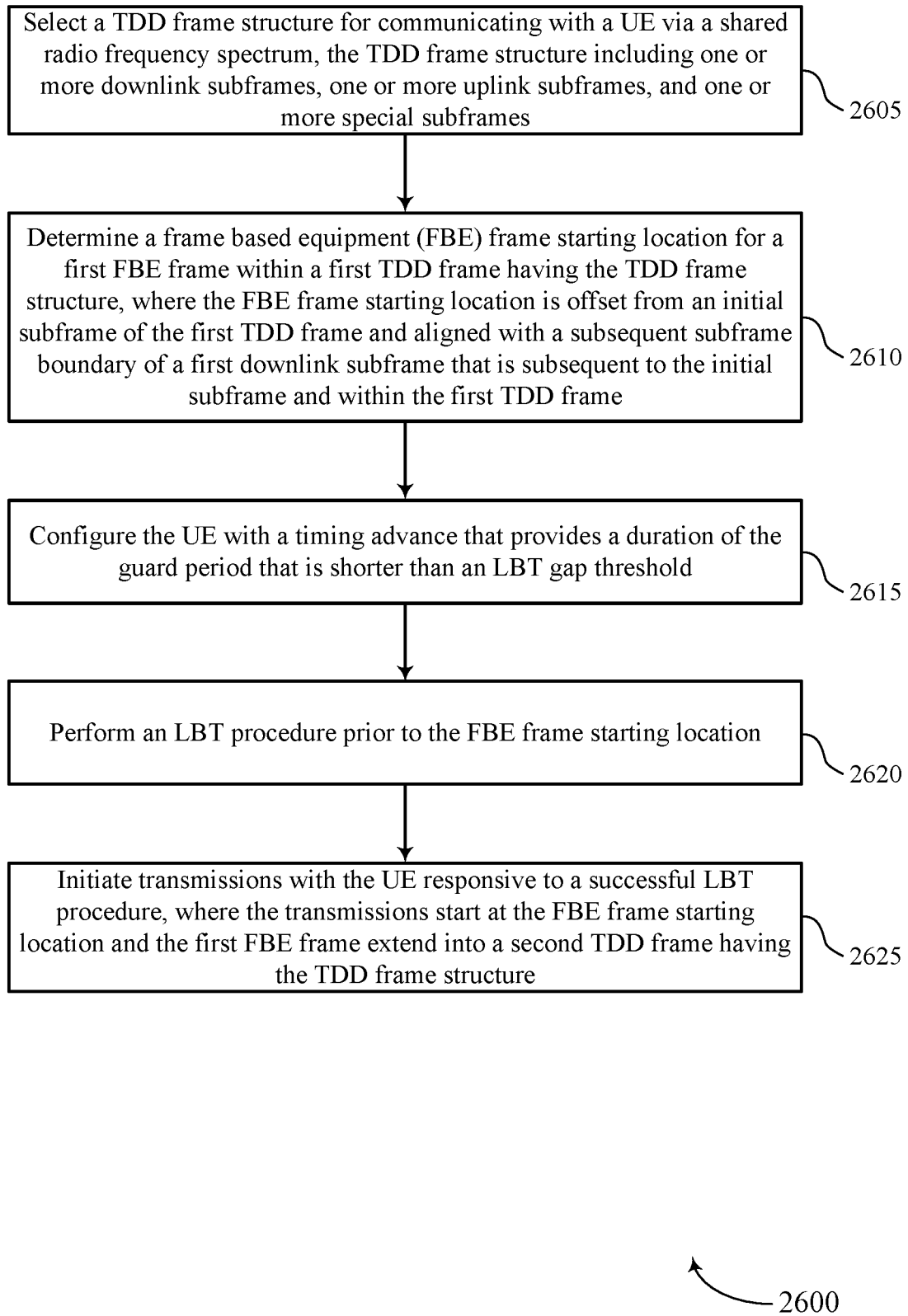

FIG. 26 shows a flowchart illustrating a method 2600 that supports time division duplexing techniques in shared radio frequency spectrum in accordance with aspects of the present disclosure. The operations of method 2600 may be implemented by a base station 105 or its components as described herein. For example, the operations of method 2600 may be performed by a communications manager as described with reference to FIGS. 21 through 24. In some examples, a base station 105 may execute a set of instructions to control the functional elements of the base station 105 to perform the functions described below. Additionally or alternatively, a base station 105 may perform aspects of the functions described below using special-purpose hardware.

At 2605, the base station 105 may select a TDD frame structure for communicating with a UE 115 via a shared radio frequency spectrum, the TDD frame structure including one or more downlink subframes, one or more uplink subframes, and one or more special subframes. The operations of 2605 may be performed according to the methods described herein. In some examples, aspects of the operations of 2605 may be performed by a TDD configuration manager as described with reference to FIGS. 21 through 24.

At 2610, the base station 105 may determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame. The operations of 2610 may be performed according to the methods described herein. In some examples, aspects of the operations of 2610 may be performed by a FBE frame manager as described with reference to FIGS. 21 through 24.

At 2615, the base station 105 may configure the UE 115 with a timing advance that provides a duration of the guard period that is shorter than an LBT gap threshold. The operations of 2615 may be performed according to the methods described herein. In some examples, aspects of the operations of 2615 may be performed by a TDD configuration manager as described with reference to FIGS. 21 through 24. In some cases, the UE 115 initiates uplink transmissions in the one or more uplink symbols without performing an LBT procedure based on the duration of the guard period being shorter than the LBT gap threshold.

At 2620, the base station 105 may perform an LBT procedure prior to the FBE frame starting location. The operations of 2620 may be performed according to the methods described herein. In some examples, aspects of the operations of 2620 may be performed by an LBT component as described with reference to FIGS. 21 through 24.

At 2625, the base station 105 may initiate transmissions with the UE 115 responsive to a successful LBT procedure, where the transmissions start at the FBE frame starting location and the first FBE frame extend into a second TDD frame having the TDD frame structure. The operations of 2625 may be performed according to the methods described herein. In some examples, aspects of the operations of 2625 may be performed by a transmission manager as described with reference to FIGS. 21 through 24.

Figure 27:
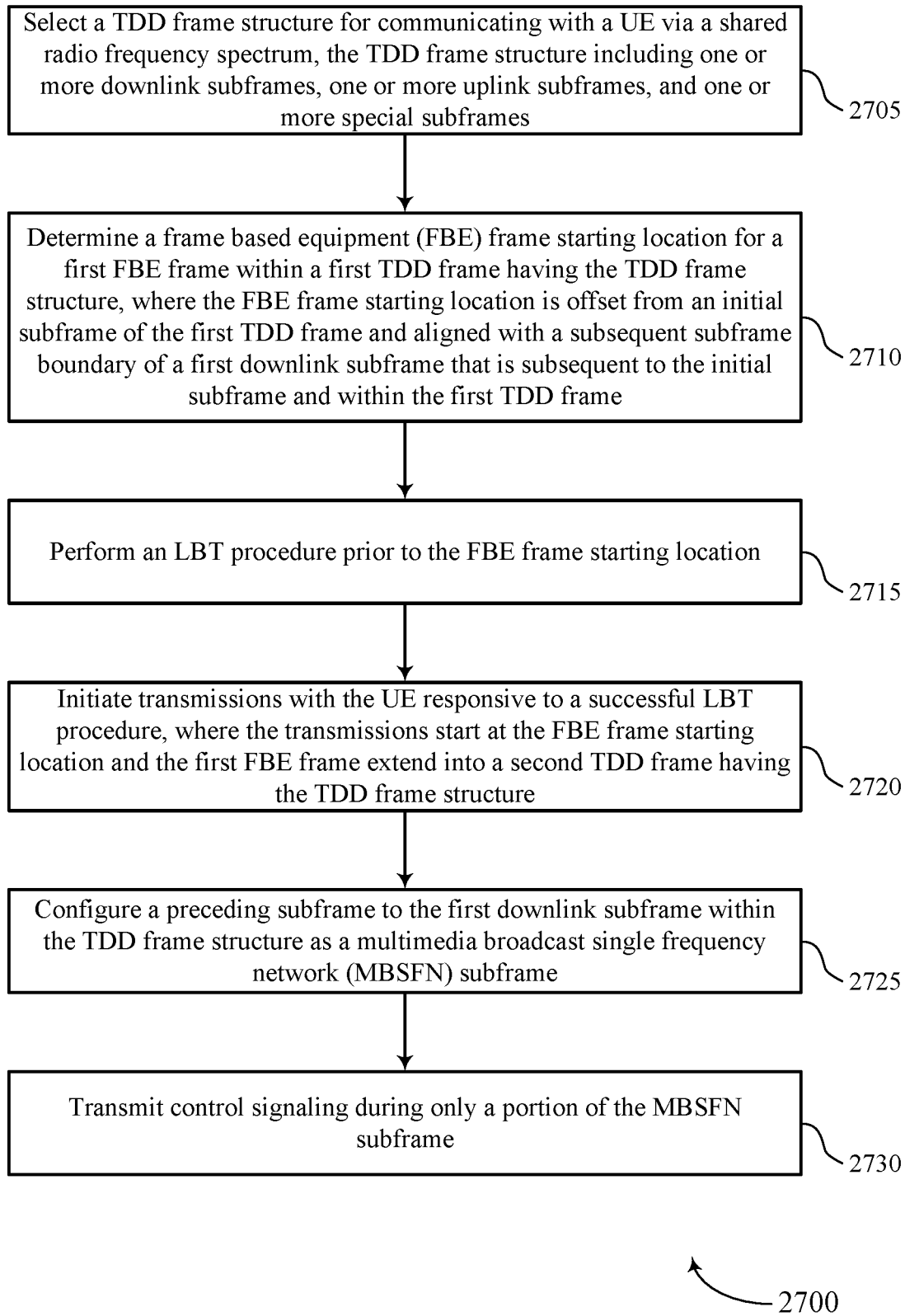

FIG. 27 shows a flowchart illustrating a method 2700 that supports time division duplexing techniques in shared radio frequency spectrum in accordance with aspects of the present disclosure. The operations of method 2700 may be implemented by a base station 105 or its components as described herein. For example, the operations of method 2700 may be performed by a communications manager as described with reference to FIGS. 21 through 24. In some examples, a base station 105 may execute a set of instructions to control the functional elements of the base station 105 to perform the functions described below. Additionally or alternatively, a base station 105 may perform aspects of the functions described below using special-purpose hardware.

At 2705, the base station 105 may select a TDD frame structure for communicating with a UE 115 via a shared radio frequency spectrum, the TDD frame structure including one or more downlink subframes, one or more uplink subframes, and one or more special subframes. The operations of 2705 may be performed according to the methods described herein. In some examples, aspects of the operations of 2705 may be performed by a TDD configuration manager as described with reference to FIGS. 21 through 24.

At 2710, the base station 105 may determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame. The operations of 2710 may be performed according to the methods described herein. In some examples, aspects of the operations of 2710 may be performed by a FBE frame manager as described with reference to FIGS. 21 through 24.

At 2715, the base station 105 may perform an LBT procedure prior to the FBE frame starting location. The operations of 2715 may be performed according to the methods described herein. In some examples, aspects of the operations of 2715 may be performed by an LBT component as described with reference to FIGS. 21 through 24.

At 2720, the base station 105 may initiate transmissions with the UE 115 responsive to a successful LBT procedure, where the transmissions start at the FBE frame starting location and the first FBE frame extend into a second TDD frame having the TDD frame structure. The operations of 2720 may be performed according to the methods described herein. In some examples, aspects of the operations of 2720 may be performed by a transmission manager as described with reference to FIGS. 21 through 24.

At 2725, the base station 105 may configure a preceding subframe to the first downlink subframe within the TDD frame structure as a multimedia broadcast single frequency network (MBSFN) subframe. The operations of 2725 may be performed according to the methods described herein. In some examples, aspects of the operations of 2725 may be performed by a TDD configuration manager as described with reference to FIGS. 21 through 24.

At 2730, the base station 105 may transmit control signaling during only a portion of the MBSFN subframe. The operations of 2730 may be performed according to the methods described herein. In some examples, aspects of the operations of 2730 may be performed by a TDD configuration manager as described with reference to FIGS. 21 through 24.

Figure 28:
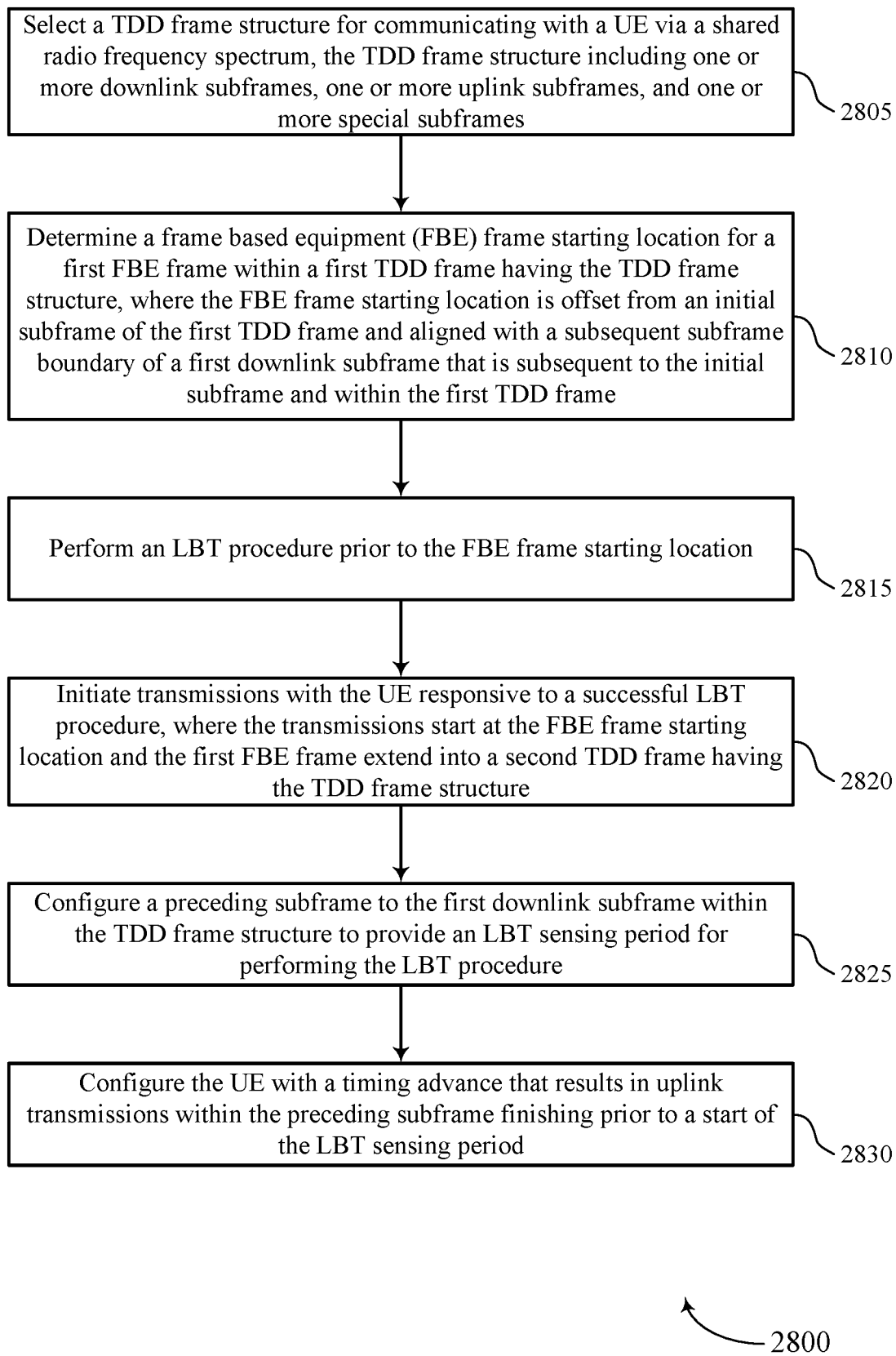

FIG. 28 shows a flowchart illustrating a method 2800 that supports time division duplexing techniques in shared radio frequency spectrum in accordance with aspects of the present disclosure. The operations of method 2800 may be implemented by a base station 105 or its components as described herein. For example, the operations of method 2800 may be performed by a communications manager as described with reference to FIGS. 21 through 24. In some examples, a base station 105 may execute a set of instructions to control the functional elements of the base station 105 to perform the functions described below. Additionally or alternatively, a base station 105 may perform aspects of the functions described below using special-purpose hardware.

At 2805, the base station 105 may select a TDD frame structure for communicating with a UE 115 via a shared radio frequency spectrum, the TDD frame structure including one or more downlink subframes, one or more uplink subframes, and one or more special subframes. The operations of 2805 may be performed according to the methods described herein. In some examples, aspects of the operations of 2805 may be performed by a TDD configuration manager as described with reference to FIGS. 21 through 24.

At 2810, the base station 105 may determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame. The operations of 2810 may be performed according to the methods described herein. In some examples, aspects of the operations of 2810 may be performed by a FBE frame manager as described with reference to FIGS. 21 through 24.

At 2815, the base station 105 may perform an LBT procedure prior to the FBE frame starting location. The operations of 2815 may be performed according to the methods described herein. In some examples, aspects of the operations of 2815 may be performed by an LBT component as described with reference to FIGS. 21 through 24.

At 2820, the base station 105 may initiate transmissions with the UE 115 responsive to a successful LBT procedure, where the transmissions start at the FBE frame starting location and the first FBE frame extend into a second TDD frame having the TDD frame structure. The operations of 2820 may be performed according to the methods described herein. In some examples, aspects of the operations of 2820 may be performed by a transmission manager as described with reference to FIGS. 21 through 24.

At 2825, the base station 105 may configure a preceding subframe to the first downlink subframe within the TDD frame structure to provide an LBT sensing period for performing the LBT procedure. The operations of 2825 may be performed according to the methods described herein. In some examples, aspects of the operations of 2825 may be performed by a TA manager as described with reference to FIGS. 21 through 24.

At 2830, the base station 105 may configure the UE 115 with a timing advance that results in uplink transmissions within the preceding subframe finishing prior to a start of the LBT sensing period. The operations of 2830 may be performed according to the methods described herein. In some examples, aspects of the operations of 2830 may be performed by a TA manager as described with reference to FIGS. 21 through 24. In some cases, the transmission gap further provides an idle period prior to the FBE frame starting location, and where the TDD frame structure is selected to provide a guard period within the one or more special subframes that meets or exceeds an idle time threshold. In some cases, the idle time threshold corresponds to five percent of a duration of the FBE frame, and where the duration of the FBE frame corresponds to a duration of the TDD frame structure.

Figure 29:
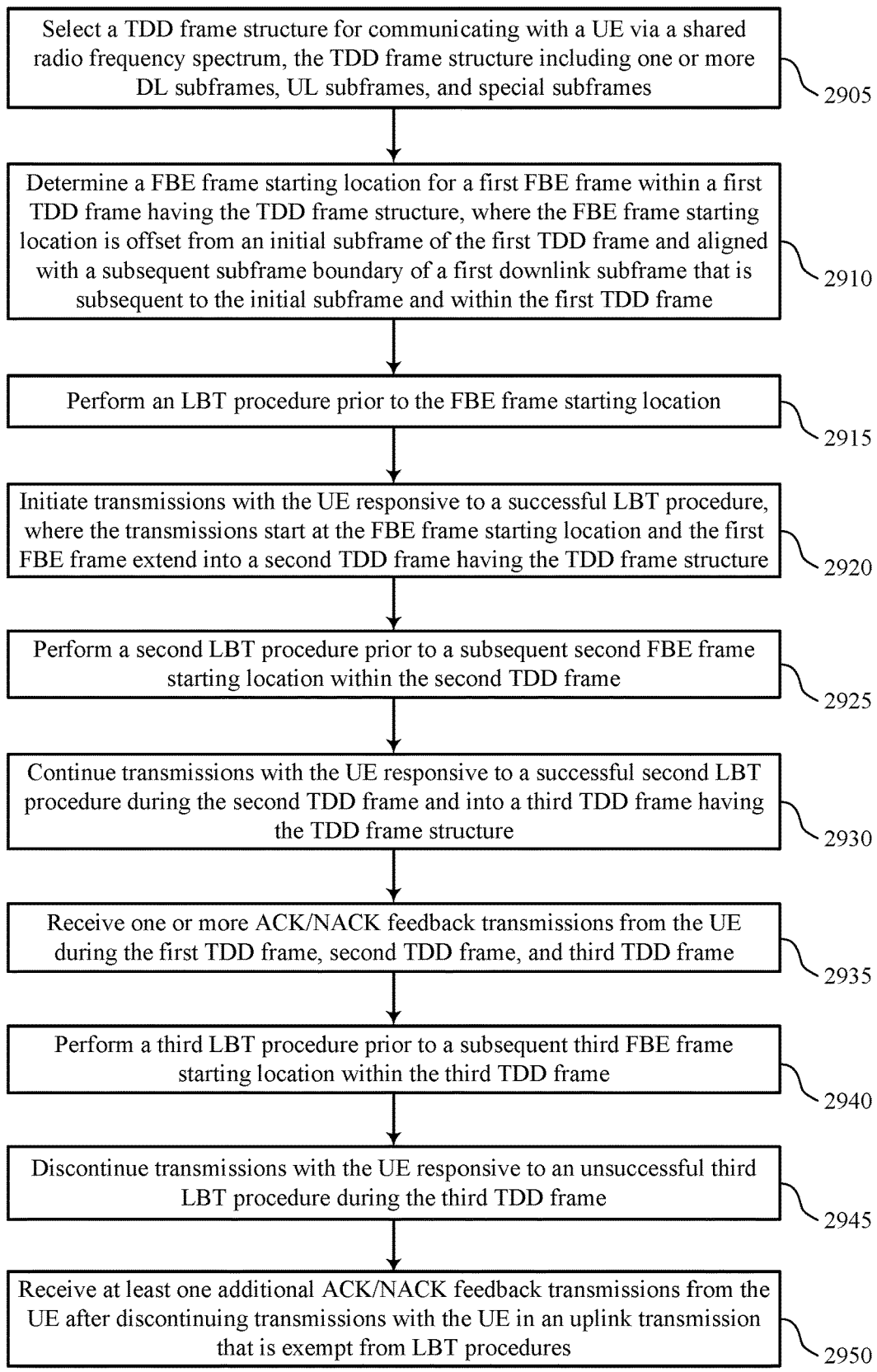

FIG. 29 shows a flowchart illustrating a method 2900 that supports time division duplexing techniques in shared radio frequency spectrum in accordance with aspects of the present disclosure. The operations of method 2900 may be implemented by a base station 105 or its components as described herein. For example, the operations of method 2900 may be performed by a communications manager as described with reference to FIGS. 21 through 24. In some examples, a base station 105 may execute a set of instructions to control the functional elements of the base station 105 to perform the functions described below. Additionally or alternatively, a base station 105 may perform aspects of the functions described below using special-purpose hardware.

At 2905, the base station 105 may select a TDD frame structure for communicating with a UE 115 via a shared radio frequency spectrum, the TDD frame structure including one or more downlink subframes, one or more uplink subframes, and one or more special subframes. The operations of 2905 may be performed according to the methods described herein. In some examples, aspects of the operations of 2905 may be performed by a TDD configuration manager as described with reference to FIGS. 21 through 24.

At 2910, the base station 105 may determine a FBE frame starting location for a first FBE frame within a first TDD frame having the TDD frame structure, where the FBE frame starting location is offset from an initial subframe of the first TDD frame and aligned with a subsequent subframe boundary of a first downlink subframe that is subsequent to the initial subframe and within the first TDD frame. The operations of 2910 may be performed according to the methods described herein. In some examples, aspects of the operations of 2910 may be performed by a FBE frame manager as described with reference to FIGS. 21 through 24.

At 2915, the base station 105 may perform an LBT procedure prior to the FBE frame starting location. The operations of 2915 may be performed according to the methods described herein. In some examples, aspects of the operations of 2915 may be performed by an LBT component as described with reference to FIGS. 21 through 24.

At 2920, the base station 105 may initiate transmissions with the UE 115 responsive to a successful LBT procedure, where the transmissions start at the FBE frame starting location and the first FBE frame extend into a second TDD frame having the TDD frame structure. The operations of 2920 may be performed according to the methods described herein. In some examples, aspects of the operations of 2920 may be performed by a transmission manager as described with reference to FIGS. 21 through 24.

At 2925, the base station 105 may perform a second LBT procedure prior to a subsequent second FBE frame starting location within the second TDD frame. The operations of 2925 may be performed according to the methods described herein. In some examples, aspects of the operations of 2925 may be performed by an LBT component as described with reference to FIGS. 21 through 24.

At 2930, the base station 105 may continue transmissions with the UE 115 responsive to a successful second LBT procedure during the second TDD frame and into a third TDD frame having the TDD frame structure. The operations of 2930 may be performed according to the methods described herein. In some examples, aspects of the operations of 2930 may be performed by a transmission manager as described with reference to FIGS. 21 through 24.

At 2935, the base station 105 may receive one or more ACK/NACK feedback transmissions from the UE 115 during the first TDD frame, second TDD frame, and third TDD frame. The operations of 2935 may be performed according to the methods described herein. In some examples, aspects of the operations of 2935 may be performed by a HARQ manager as described with reference to FIGS. 21 through 24.

At 2940, the base station 105 may perform a third LBT procedure prior to a subsequent third FBE frame starting location within the third TDD frame. The operations of 2940 may be performed according to the methods described herein. In some examples, aspects of the operations of 2940 may be performed by an LBT component as described with reference to FIGS. 21 through 24.

At 2945, the base station 105 may discontinue transmissions with the UE 115 responsive to an unsuccessful third LBT procedure during the third TDD frame. The operations of 2945 may be performed according to the methods described herein. In some examples, aspects of the operations of 2945 may be performed by a transmission manager as described with reference to FIGS. 21 through 24.

At 2950, the base station 105 may receive at least one additional ACK/NACK feedback transmission from the UE 115 after discontinuing transmissions with the UE 115 in an uplink transmission that is exempt from LBT procedures. The operations of 2950 may be performed according to the methods described herein. In some examples, aspects of the operations of 2950 may be performed by a HARQ manager as described with reference to FIGS. 21 through 24.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    selecting a time division duplexing (TDD) frame structure for communicating with a user equipment (UE) via a shared radio frequency spectrum, the TDD frame structure including one or more downlink subframes, one or more uplink subframes, and one or more special subframes;
    determining a frame based equipment (FBE) frame starting location for a first FBE frame within a first TDD frame having the TDD frame structure, wherein the FBE frame starting location is offset from an initial subframe of the first TDD frame and aligned with a subsequent subframe boundary of a first downlink subframe that is subsequent to the initial subframe and within the first TDD frame;
    performing a listen-before-talk (LBT) procedure prior to the FBE frame starting location; and
    initiating transmissions with the UE responsive to a successful LBT procedure, wherein the transmissions start at the FBE frame starting location and the first FBE frame extend into a second TDD frame having the TDD frame structure.

2. The method of claim 1, further comprising:
configuring a preceding subframe to the first downlink subframe within the TDD frame structure to provide a transmission gap prior to the FBE frame starting location.

3. The method of claim 2, wherein the transmission gap provides an idle period prior to the FBE frame starting location.

4. The method of claim 1, wherein the one or more special subframes include one or more downlink symbols, one or more uplink symbols, and a guard period between the downlink symbols and uplink symbols, and wherein the method further comprises:
configuring the UE with a timing advance that provides a duration of the guard period that is shorter than an LBT gap threshold.

5. The method of claim 4, wherein the UE initiates uplink transmissions in the one or more uplink symbols without performing an LBT procedure based on the duration of the guard period being shorter than the LBT gap threshold.

6. The method of claim 1, further comprising:
configuring a preceding subframe to the first downlink subframe within the TDD frame structure as a multimedia broadcast single frequency network (MBSFN) subframe; and
transmitting control signaling during only a portion of the MBSFN subframe.

7. The method of claim 6, wherein the first downlink subframe is a second subframe in time of a downlink subframe burst and the preceding subframe to the first downlink subframe is a first downlink subframe in time of the downlink subframe burst.

8. The method of claim 1, further comprising:
configuring a preceding subframe to the first downlink subframe within the TDD frame structure to provide a transmission gap comprising an LBT sensing period for performing the LBT procedure; and
configuring the UE with a timing advance that results in uplink transmissions within the preceding subframe finishing prior to a start of the LBT sensing period.

9. The method of claim 8, wherein the transmission gap further provides an idle period prior to the FBE frame starting location, and wherein the TDD frame structure is selected to provide a guard period within the one or more special subframes that meets or exceeds an idle time threshold.

10. The method of claim 9, wherein the idle time threshold corresponds to five percent of a duration of the FBE frame, and wherein the duration of the FBE frame corresponds to a duration of the TDD frame structure.

11. The method of claim 8, wherein the first downlink subframe is a first subframe in time of a last downlink subframe burst of the selected TDD frame structure.

12. The method of claim 1, further comprising:
performing a second LBT procedure prior to a subsequent second FBE frame starting location within the second TDD frame;
continuing transmissions with the UE responsive to a successful second LBT procedure during the second TDD frame and into a third TDD frame having the TDD frame structure; and
receiving one or more acknowledgment/negative-acknowledgment (ACK/NACK) feedback transmissions from the UE during the first TDD frame, the second TDD frame, and the third TDD frame.

13. The method of claim 12, further comprising:
performing a third LBT procedure prior to a subsequent third FBE frame starting location within the third TDD frame;
discontinuing transmissions with the UE responsive to an unsuccessful third LBT procedure during the third TDD frame; and
receiving at least one additional ACK/NACK feedback transmissions from the UE after discontinuing transmissions with the UE in an uplink transmission that is exempt from LBT procedures.

14. An apparatus for wireless communication, comprising:
a processor,
memory in electronic communication with the processor; and
instructions stored in the memory and executable by the processor to cause the apparatus to:
select a time division duplexing (TDD) frame structure for communicating with a user equipment (UE) via a shared radio frequency spectrum, the TDD frame structure including one or more downlink subframes, one or more uplink subframes, and one or more special subframes;
determine a frame based equipment (FBE) frame starting location for a first FBE frame within a first TDD frame having the TDD frame structure, wherein the FBE frame starting location is offset from an initial subframe of the first TDD frame and aligned with a subsequent subframe boundary of a first downlink subframe that is subsequent to the initial subframe and within the first TDD frame;
perform a listen-before-talk (LBT) procedure prior to the FBE frame starting location; and
initiate transmissions with the UE responsive to a successful LBT procedure, wherein the transmissions start at the FBE frame starting location and the first FBE frame extend into a second TDD frame having the TDD frame structure.

15. The apparatus of claim 14, wherein the instructions are further executable by the processor to cause the apparatus to:
configure a preceding subframe to the first downlink subframe within the TDD frame structure to provide a transmission gap prior to the FBE frame starting location.

16. The apparatus of claim 15, wherein the transmission gap provides an idle period prior to the FBE frame starting location.

17. The apparatus of claim 14, wherein the one or more special subframes include one or more downlink symbols, one or more uplink symbols, and a guard period between the downlink symbols and uplink symbols, and wherein the instructions are further executable by the processor to cause the apparatus to:
configure the UE with a timing advance that provides a duration of the guard period that is shorter than an LBT gap threshold.

18. The apparatus of claim 17, wherein the UE initiates uplink transmissions in the one or more uplink symbols without performing an LBT procedure based on the duration of the guard period being shorter than the LBT gap threshold.

19. The apparatus of claim 14, wherein the instructions are further executable by the processor to cause the apparatus to:

configure a preceding subframe to the first downlink subframe within the TDD frame structure as a multimedia broadcast single frequency network (MBSFN) subframe; and transmit control signaling during only a portion of the MBSFN subframe.

20. The apparatus of claim 19, wherein the first downlink subframe is a second subframe in time of a downlink subframe burst and the preceding subframe to the first downlink subframe is a first downlink subframe in time of the downlink subframe burst.

21. The apparatus of claim 14, wherein the instructions are further executable by the processor to cause the apparatus to:

configure a preceding subframe to the first downlink subframe within the TDD frame structure to provide a transmission gap comprising an LBT sensing period for performing the LBT procedure; and configure the UE with a timing advance that results in uplink transmissions within the preceding subframe finishing prior to a start of the LBT sensing period.

22. The apparatus of claim 21, wherein the transmission gap further provides an idle period prior to the FBE frame starting location, and wherein the TDD frame structure is selected to provide a guard period within the one or more special subframes that meets or exceeds an idle time threshold.

23. The apparatus of claim 22, wherein the idle time threshold corresponds to five percent of a duration of the FBE frame, and wherein the duration of the FBE frame corresponds to a duration of the TDD frame structure.

24. The apparatus of claim 21, wherein the first downlink subframe is a first subframe in time of a last downlink subframe burst of the selected TDD frame structure.

25. The apparatus of claim 14, wherein the instructions are further executable by the processor to cause the apparatus to:

perform a second LBT procedure prior to a subsequent second FBE frame starting location within the second TDD frame;

continue transmissions with the UE responsive to a successful second LBT procedure during the second TDD frame and into a third TDD frame having the TDD frame structure; and receive one or more acknowledgment/negative-acknowledgment (ACK/NACK) feedback transmissions from the UE during the first TDD frame, second TDD frame, and third TDD frame.

26. The apparatus of claim 25, wherein the instructions are further executable by the processor to cause the apparatus to:

perform a third LBT procedure prior to a subsequent third FBE frame starting location within the third TDD frame;

discontinue transmissions with the UE responsive to an unsuccessful third LBT procedure during the third TDD frame; and receive at least one additional ACK/NACK feedback transmissions from the UE after discontinuing transmissions with the UE in an uplink transmission that is exempt from LBT procedures.

27. An apparatus for wireless communication, comprising:

means for selecting a time division duplexing (TDD) frame structure for communicating with a user equipment (UE) via a shared radio frequency spectrum, the TDD frame structure including one or more downlink subframes, one or more uplink subframes, and one or more special subframes;

means for determining a frame based equipment (FBE) frame starting location for a first FBE frame within a first TDD frame having the TDD frame structure, wherein the FBE frame starting location is offset from an initial subframe of the first TDD frame and aligned with a subsequent subframe boundary of a first downlink subframe that is subsequent to the initial subframe and within the first TDD frame;

means for performing a listen-before-talk (LBT) procedure prior to the FBE frame starting location; and means for initiating transmissions with the UE responsive to a successful LBT procedure, wherein the transmissions start at the FBE frame starting location and the first FBE frame extend into a second TDD frame having the TDD frame structure.

28. The apparatus of claim 27, further comprising:

means for configuring a preceding subframe to the first downlink subframe within the TDD frame structure to provide a transmission gap prior to the FBE frame starting location.

29. The apparatus of claim 28, wherein the transmission gap provides an idle period prior to the FBE frame starting location.

30. A non-transitory computer-readable medium storing code for wireless communication, the code comprising instructions executable by a processor to:

select a time division duplexing (TDD) frame structure for communicating with a user equipment (UE) via a shared radio frequency spectrum, the TDD frame structure including one or more downlink subframes, one or more uplink subframes, and one or more special subframes;

determine a frame based equipment (FBE) frame starting location for a first FBE frame within a first TDD frame having the TDD frame structure, wherein the FBE frame starting location is offset from an initial subframe of the first TDD frame and aligned with a subsequent subframe boundary of a first downlink subframe that is subsequent to the initial subframe and within the first TDD frame;

perform a listen-before-talk (LBT) procedure prior to the FBE frame starting location; and initiate transmissions with the UE responsive to a successful LBT procedure, wherein the transmissions start at the FBE frame starting location and the first FBE frame extend into a second TDD frame having the TDD frame structure.

* * * * *